(12) United States Patent
Sato

(10) Patent No.: US 10,477,604 B2
(45) Date of Patent: Nov. 12, 2019

(54) COMMUNICATION APPARATUS, CONTROL METHOD FOR COMMUNICATION APPARATUS, AND NON-TRANSITORY COMPUTER-READABLE STORAGE MEDIUM

(71) Applicant: CANON KABUSHIKI KAISHA, Tokyo (JP)

(72) Inventor: Ryosuke Sato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 8 days.

(21) Appl. No.: 15/951,472

(22) Filed: Apr. 12, 2018

(65) Prior Publication Data

US 2018/0310355 A1 Oct. 25, 2018

(30) Foreign Application Priority Data

Apr. 24, 2017 (JP) ................. 2017-085609

(51) Int. Cl.
*H04W 76/15* (2018.01)
*H04W 52/02* (2009.01)
*H04W 52/28* (2009.01)

(52) U.S. Cl.
CPC ....... *H04W 76/15* (2018.02); *H04W 52/0216* (2013.01); *H04W 52/0219* (2013.01); *H04W 52/0229* (2013.01); *H04W 52/0258* (2013.01); *H04W 52/288* (2013.01)

(58) Field of Classification Search
CPC ...... H04B 1/006; H04B 1/0067; H04B 1/406; H04W 72/1215; H04W 88/06; H04W 1/7253; H04W 52/0235; H04W 84/12; H04W 84/18; H04W 76/15;
(Continued)

(56) References Cited

U.S. PATENT DOCUMENTS 7,787,821 B2 8/2010 Hamaguchi
2007/0265009 A1* 11/2007 Hamaguchi ......... H04M 1/7253
455/436

(Continued)

FOREIGN PATENT DOCUMENTS

JP 2007306201 A 11/2007

*Primary Examiner* — Jung Liu
(74) *Attorney, Agent, or Firm* — Rossi, Kimms & McDowell LLP

(57) ABSTRACT

A communication apparatus comprises a transceiver configured to communicate a wireless signal complying with a first communication method for searching for another communication apparatus and a storage apparatus, and a controller configured to control, if the transceiver detects the other communication apparatus and the storage apparatus, the transceiver to transmit, to the other communication apparatus and the storage apparatus using the first communication method, a first request for causing the other communication apparatus and the storage apparatus to transit from a first state in which communication using a second communication method different from the first communication method is restricted to a second state in which communication using the second communication method is possible in order to transmit data stored in the other communication apparatus to the storage apparatus using the second communication method.

12 Claims, 28 Drawing Sheets

(58) Field of Classification Search
CPC ............ H04W 52/0258; H04W 52/288; Y02D 70/162; Y02D 70/142; Y02D 70/144
See application file for complete search history.

(56) References Cited

U.S. PATENT DOCUMENTS

| | | | | |
|---|---|---|---|---|
| 2008/0058031 | A1* | 3/2008 | Deprun | H04W 52/0229 |
| | | | | 455/574 |
| 2010/0008338 | A1* | 1/2010 | Tsfati | H04B 1/006 |
| | | | | 370/338 |
| 2010/0309831 | A1* | 12/2010 | Yeh | H04W 52/0216 |
| | | | | 370/311 |
| 2010/0316027 | A1* | 12/2010 | Rick | H04B 1/406 |
| | | | | 370/336 |
| 2013/0223419 | A1* | 8/2013 | Ghosh | H04W 52/0235 |
| | | | | 370/338 |
| 2014/0206346 | A1* | 7/2014 | Kiukkonen | H04W 52/0229 |
| | | | | 455/426.1 |

* cited by examiner

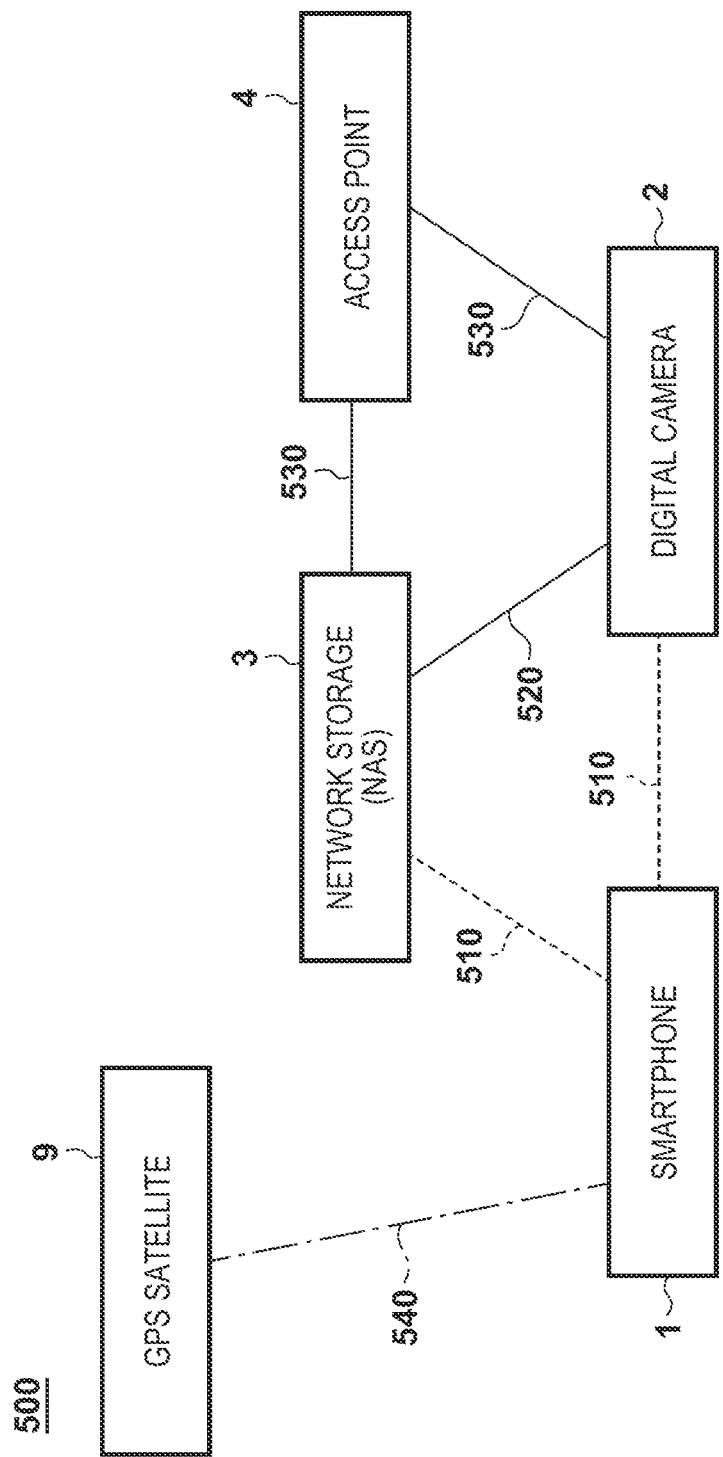

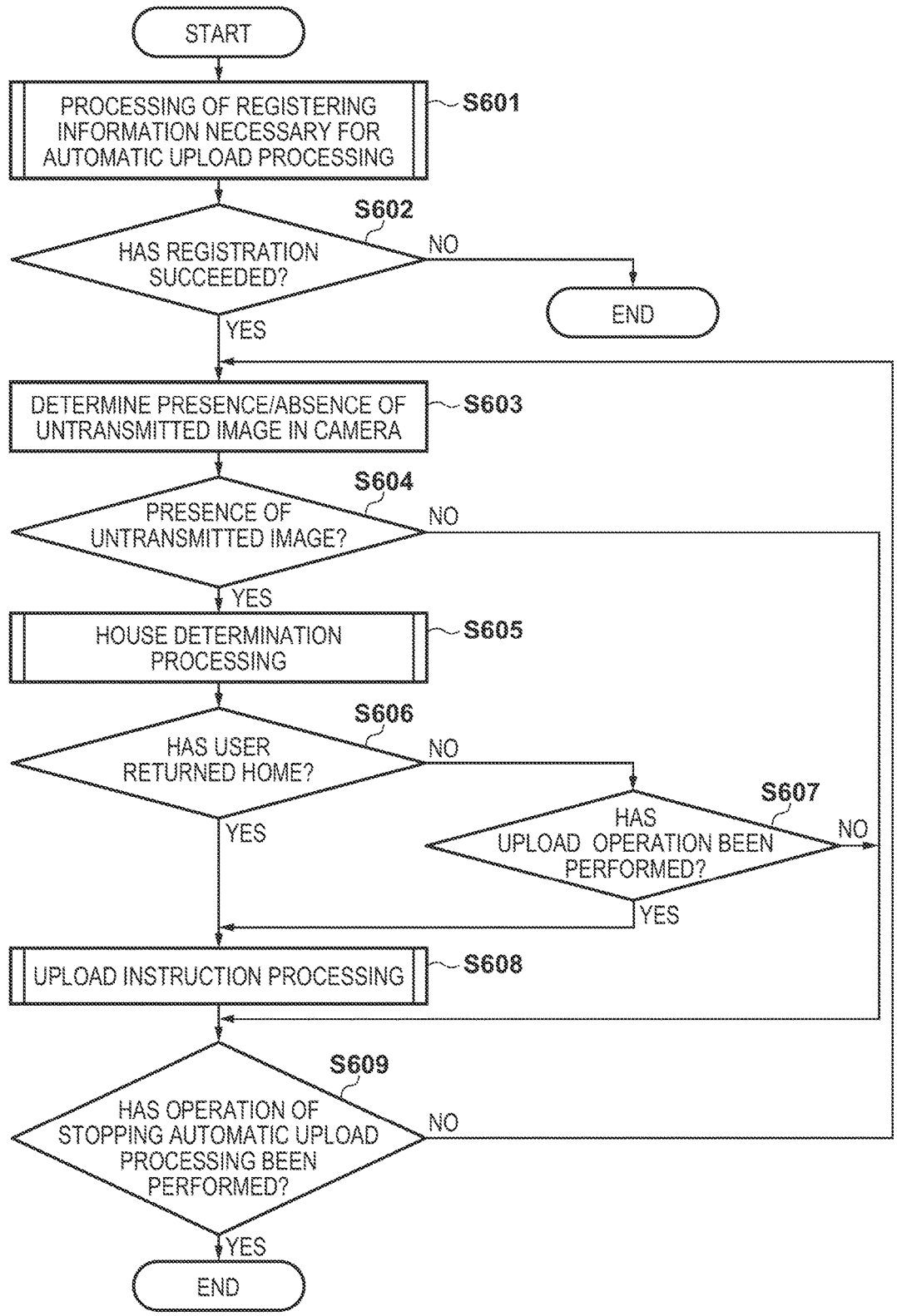

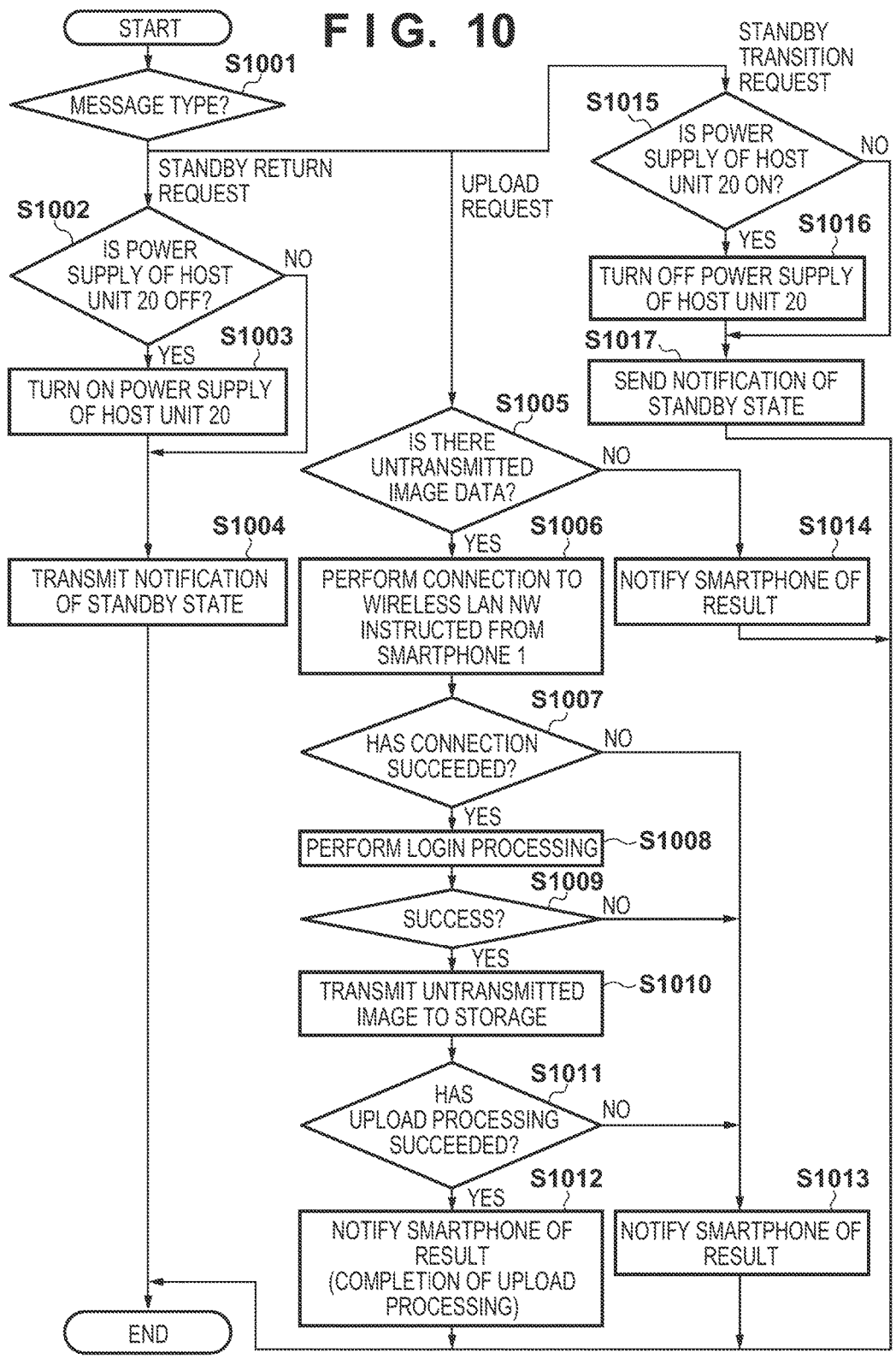

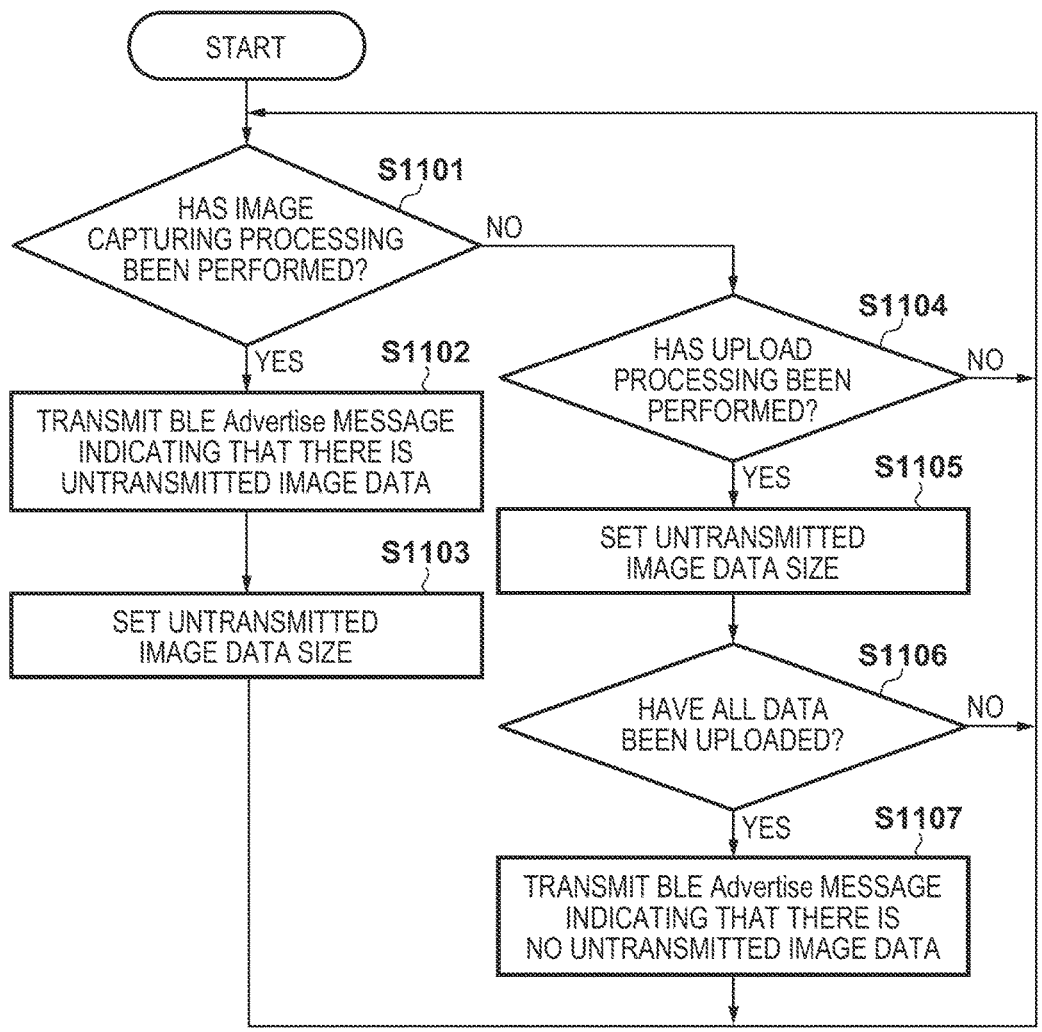

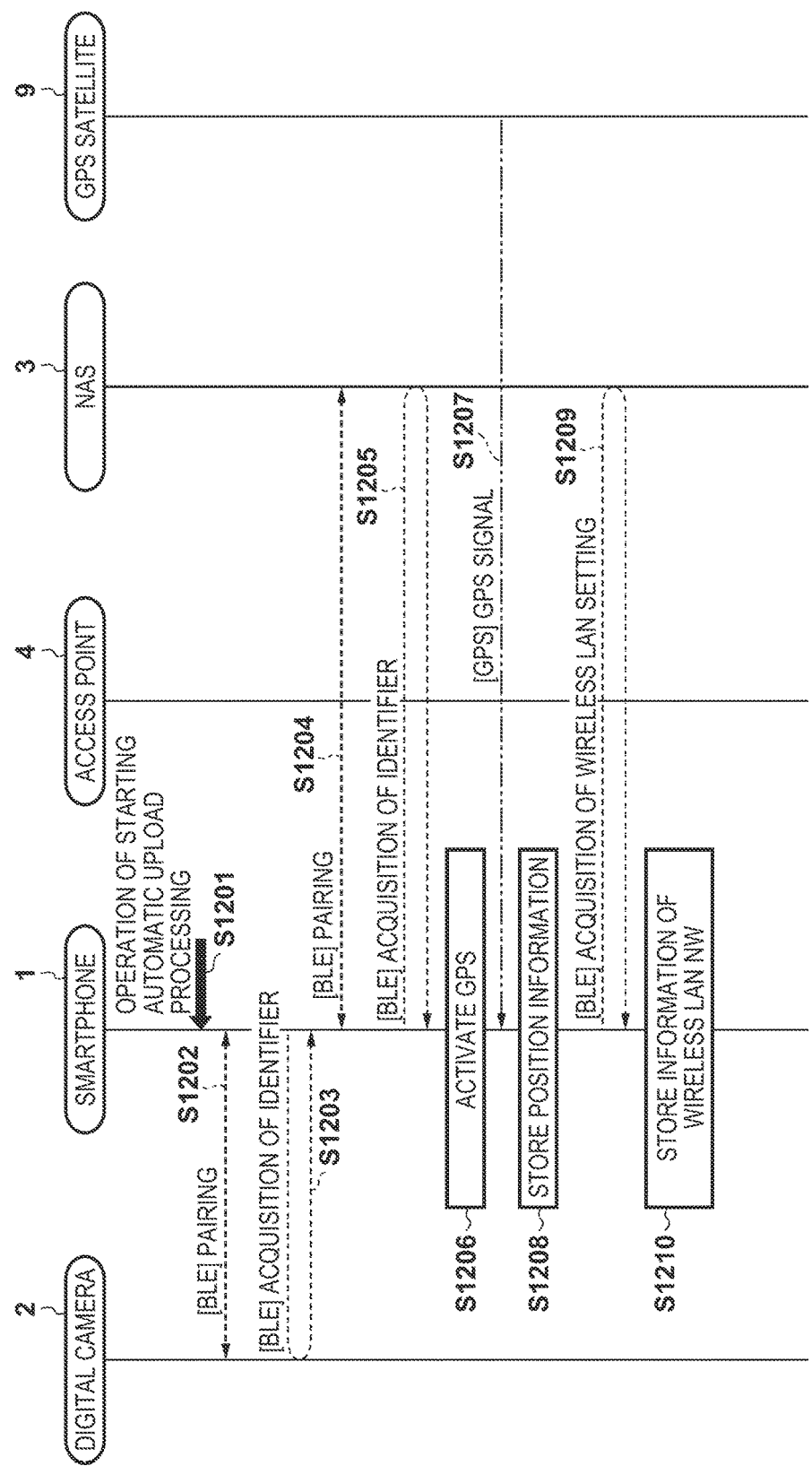

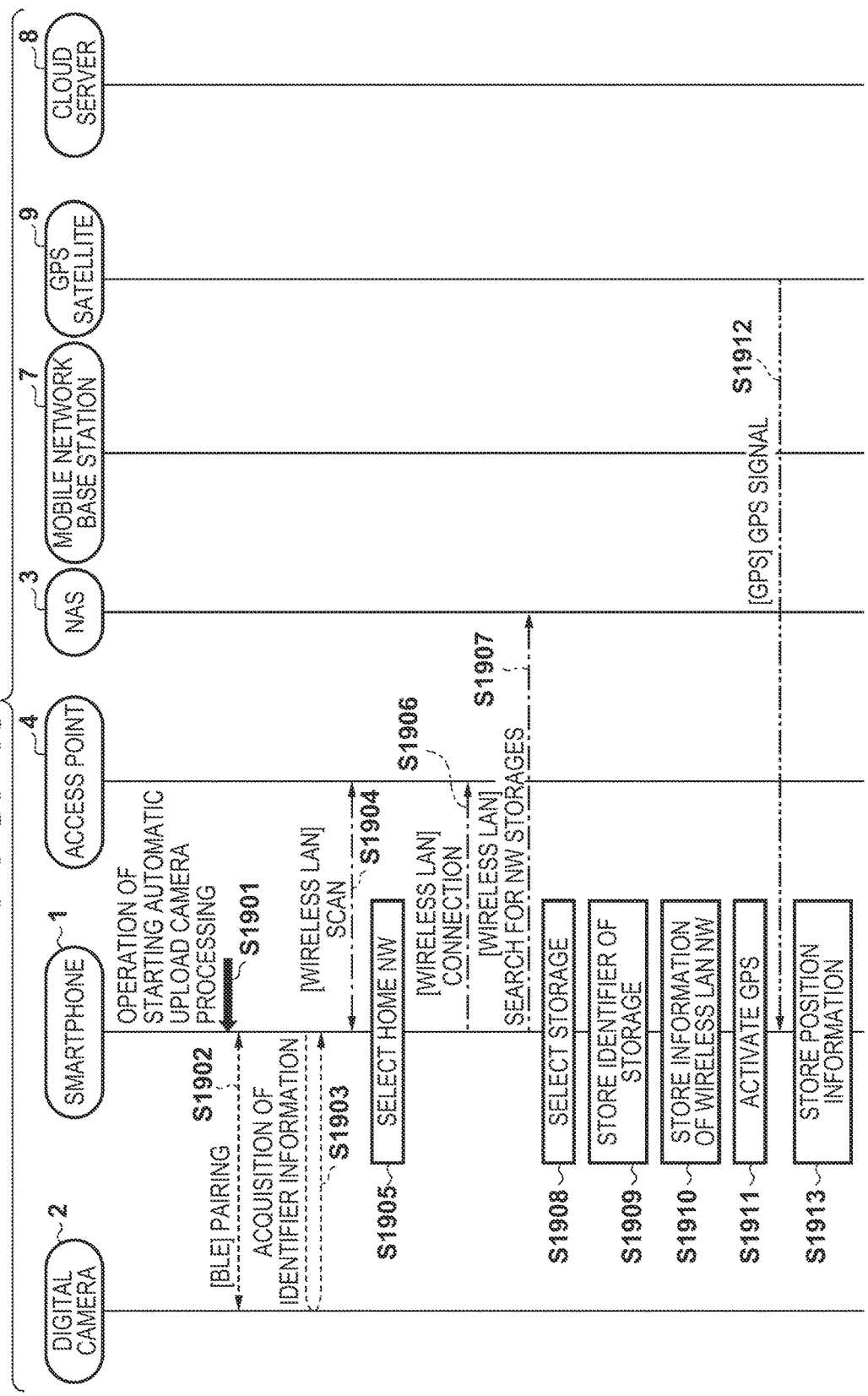

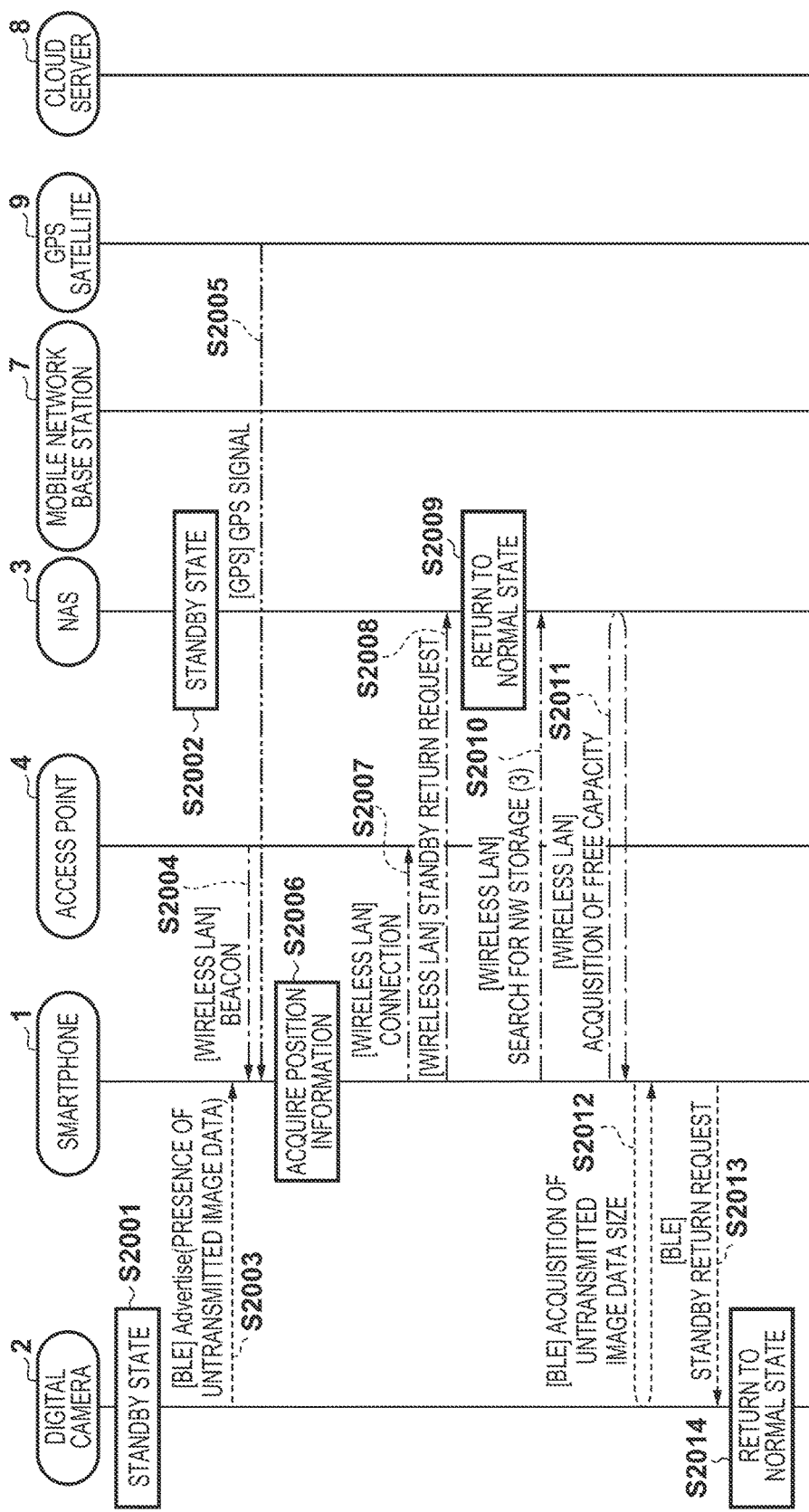

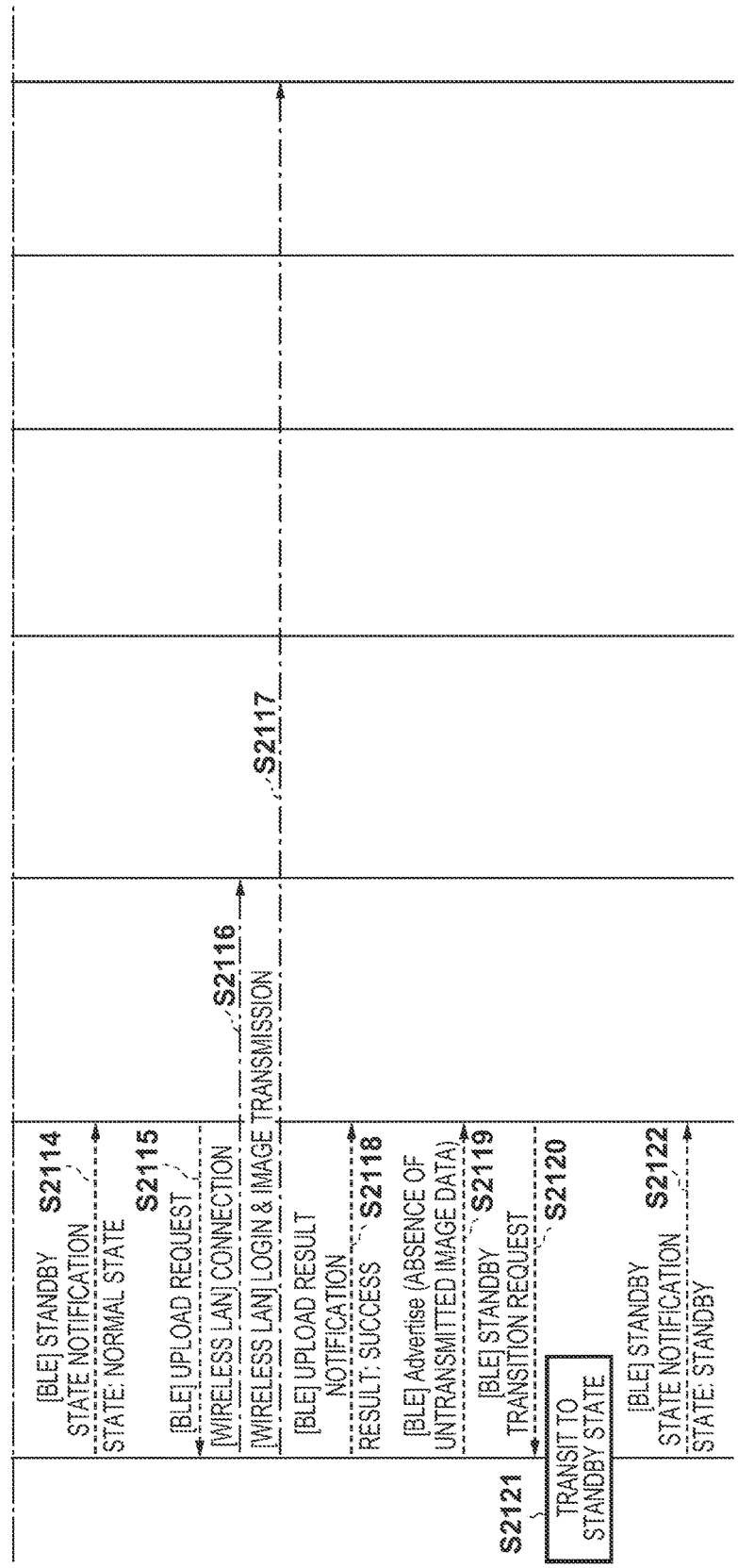

COMMUNICATION APPARATUS, CONTROL METHOD FOR COMMUNICATION APPARATUS, AND NON-TRANSITORY COMPUTER-READABLE STORAGE MEDIUM

BACKGROUND OF THE INVENTION

Field of the Invention

The present invention relates to a communication apparatus, a control method for the communication apparatus, and a non-transitory computer-readable storage medium.

Description of the Related Art

In recent years, a base station that performs wireless LAN communication complying with the IEEE802.11 series has been installed in a house or store. When a user inputs information of a wireless network generated by a base station to a communication apparatus such as a camera or selects it, the communication apparatus can perform wireless LAN communication with the base station.

On the other hand, BLE (Bluetooth® Low Energy) communication that allows communication with power consumption lower than that of wireless LAN communication has been standardized, and there exists a communication apparatus that performs wireless LAN communication and BLE communication. Japanese Patent Laid-Open No. 2007-306201 discloses an arrangement in which a wireless apparatus notifies a partner apparatus of the start of wireless LAN communication via communication with power consumption lower than that of wireless LAN communication in response to a user instruction, and performs wireless LAN communication with the partner apparatus. In this arrangement, the communication apparatus need only communicate with the partner apparatus with low power consumption until wireless LAN communication with the partner apparatus starts, thereby making it possible to reduce power consumption.

Consider a case in which the partner apparatus is to be connected to the base station while the communication apparatus communicates with the partner apparatus with low power consumption. This is a case in which, for example, the partner apparatus is a camera, and media data are to be uploaded to a storage device via the base station. In this case, it is expected that the user's load increases since the user who operates the communication apparatus needs to recognize the location of the base station and an operation for the communication apparatus can be complicated.

SUMMARY OF THE INVENTION

The present invention has been made in consideration of the above problem, and provides a technique for readily connecting a plurality of communication apparatuses in a predetermined location while reducing the power consumption.

According to one aspect of the present invention, there is provided a communication apparatus which comprises: a transceiver configured to communicate a wireless signal complying with a first communication method for searching for another communication apparatus and a storage apparatus; and a controller configured to control, if the transceiver detects the other communication apparatus and the storage apparatus, the transceiver to transmit, to the other communication apparatus and the storage apparatus using the first communication method, a first request for causing the other communication apparatus and the storage apparatus to transit from a first state in which communication using a second communication method different from the first communication method is restricted to a second state in which communication using the second communication method is possible in order to transmit data stored in the other communication apparatus to the storage apparatus using the second communication method.

Further features of the present invention will become apparent from the following description of exemplary embodiments (with reference to the attached drawings).

BRIEF DESCRIPTION OF THE DRAWINGS

FIG. 5 is a block diagram showing an example of the arrangement of a communication system 500 according to the first embodiment;

FIG. 6 is a flowchart illustrating the operation procedure of the smartphone 1 according to the first and second embodiments;

FIG. 10 is a flowchart illustrating an operation procedure of the digital camera 2 when receiving a BLE message according to the first embodiment;

FIG. 11 is a flowchart illustrating the operation procedure of processing of managing the presence/absence of untransmitted image data by the digital camera 2 according to the first embodiment;

FIG. 12 is a sequence chart showing an example of a communication sequence at the start of automatic upload processing according to the first embodiment;

FIG. 19 is a sequence chart showing an example of a communication sequence at the start of automatic upload processing according to the second embodiment;

FIGS. 20A and 20B are sequence charts showing an example of a communication sequence when the user returns home with a smartphone 1 and a digital camera 2 according to the second embodiment; and FIGS. 21A and 21B are sequence charts showing another example of the communication sequence when the user returns home with the smartphone 1 and the digital camera 2 according to the second embodiment.

DESCRIPTION OF THE EMBODIMENTS

Figure 1:
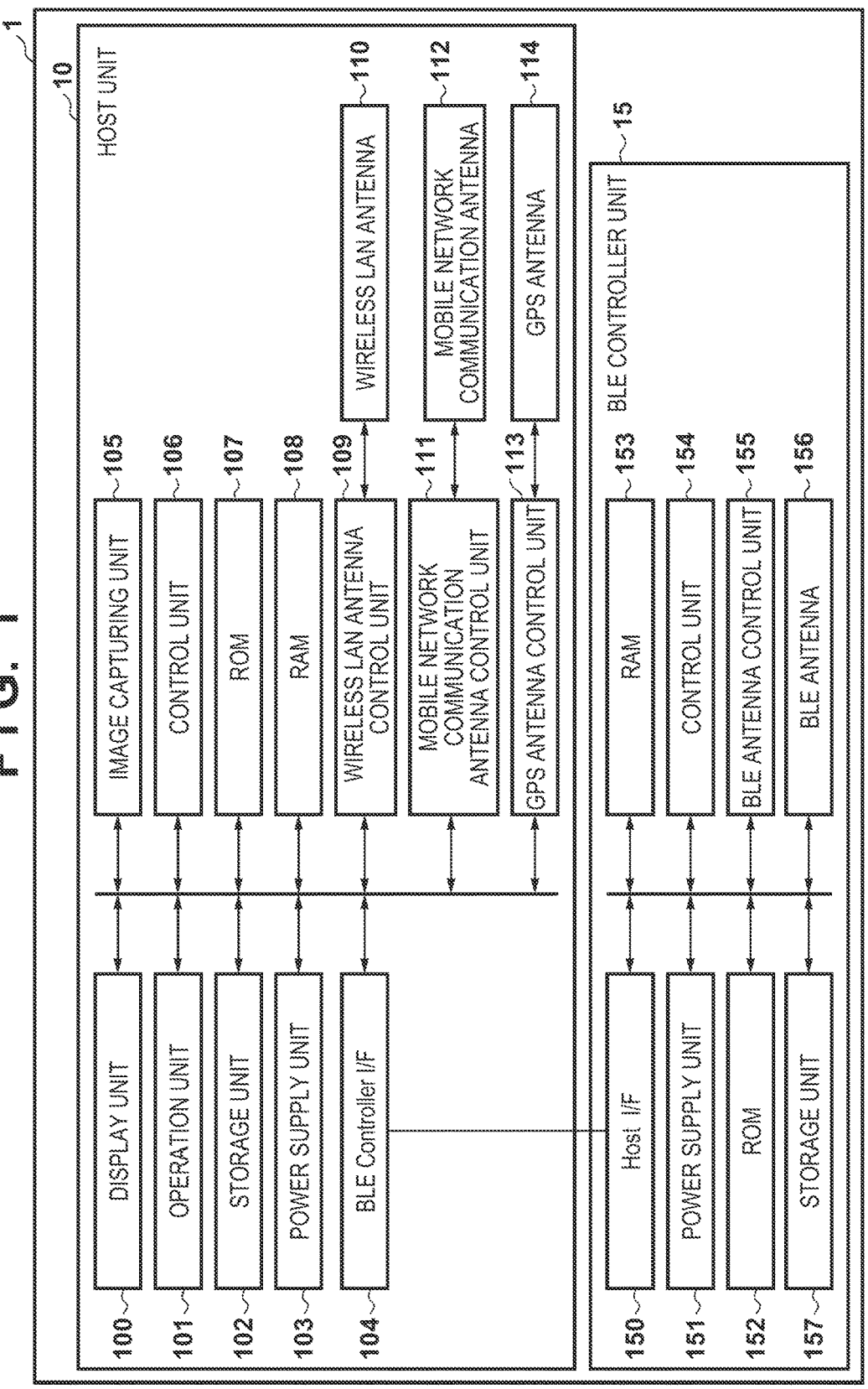
FIG. 1 is a block diagram showing an example of the hardware arrangement of a smartphone 1.

The present invention will be described in detail below based on embodiments of the present invention with reference to the accompanying drawings. Note that arrangements to be described in the following embodiments are merely examples, and the present invention is not limited to the illustrated arrangements. Assume that BLE communication to be described below is communication by a wireless communication method complying with Bluetooth® Low Energy as the first communication method, and communication via a wireless LAN network is communication by a wireless communication method complying with the IEEE802.11 series as the second communication method.

(First Embodiment)

FIG. 5 shows a communication system 500 assumed in the first embodiment. The communication system 500 includes a smartphone 1, a digital camera 2, a network storage (NAS) 3, an access point 4, and a GPS (Global Positioning System) satellite 9. The smartphone 1 can be connected to the digital camera 2 and the NAS 3 by BLE communication 510. In the BLE communication 510, the digital camera 2 and the NAS 3 operate as BLE peripheral devices, and the smartphone 1 operates as a BLE central device. Furthermore, the smartphone 1 receives a GPS signal 540 sent from the GPS satellite 9.

The digital camera 2 can be connected to the NAS 3 via a wireless LAN network 520 generated by the NAS 3. The digital camera 2 can also be connected to the NAS 3 via a wireless LAN network 530 generated by the access point 4. Assume, for example, that the smartphone 1 and the digital camera 2 can be freely carried by the user within a predetermined range (for example, the house of the user), and the NAS 3 is stationarily installed within the predetermined range. Note that the smartphone 1, the digital camera 2, and the NAS 3 are examples for explaining this embodiment. The present invention is not limited to them, and any apparatuses that can create the network shown in FIG. 5 and have the following functions can be used.

FIG. 1 shows an example of the hardware arrangement of the smartphone 1. The smartphone 1 includes a Host unit 10 and a BLE Controller unit 15.

The Host unit 10 includes a display unit 100, an operation unit 101, a storage unit 102, a power supply unit 103, a BLE Controller I/F 104, an image capturing unit 105, a control unit 106, a ROM 107, and a RAM 108. The Host unit 10 also includes a wireless LAN antenna control unit 109, a wireless LAN antenna 110, a mobile network communication antenna control unit 111, a mobile network communication antenna 112, a GPS antenna control unit 113, and a GPS antenna 114.

The display unit 100 and the operation unit 101, for example, display and execute an application. The storage unit 102 stores and manages various kinds of data such as wireless communication network information, data transmission/reception information, and image data. The power supply unit 103 is, for example, a battery, and supplies power to the Host unit 10. The BLE Controller I/F 104 is an interface connected to the BLE Controller unit 15. The image capturing unit 105 captures a photo or video. The control unit 106 is, for example, a CPU (Central Processing Unit), and controls the operation of each constituent element of the smartphone 1. The ROM (Read Only Memory) 107 stores control instructions, that is, programs. The RAM (Random Access Memory) 108 is used to temporarily save data or serves as a work memory when executing a program. The wireless LAN antenna control unit 109 controls the wireless LAN antenna 110 to perform wireless LAN communication. The mobile network communication antenna control unit 111 controls the mobile network communication antenna 112 to perform mobile network communication. The GPS antenna control unit 113 controls the GPS antenna 114 to receive a notification from the GPS satellite 9.

On the other hand, the BLE Controller unit 15 includes a Host I/F 150, a power supply unit 151, a ROM 152, a RAM 153, a control unit 154, a BLE antenna control unit 155, a BLE antenna 156, and a storage unit 157.

The Host I/F 150 is an interface connected to the Host unit 10. The power supply unit 151 is, for example, a battery, and supplies power to the BLE Controller unit 15. The ROM 152 stores control instructions, that is, programs, especially, programs related to BLE communication. The RAM 153 is used to temporarily save data or serves as a work memory when executing a program. The control unit 154 is, for example, a CPU, and controls the operation of each constituent element of the BLE Controller unit 15. The BLE antenna control unit 155 controls the BLE antenna 156 to perform BLE communication. The storage unit 157 stores and manages data to be transmitted by BLE communication, wireless LAN network setting information, and the like.

In this embodiment, when the BLE Controller unit 15 has the above-described arrangement, the BLE Controller unit 15 can operate independently of the Host unit 10. That is, even if the power supply unit 103 stops power supply to the Host unit 10, the BLE Controller unit 15 can be activated by power supply from the power supply unit 151, and communicate with an external apparatus by BLE.

Figure 2:
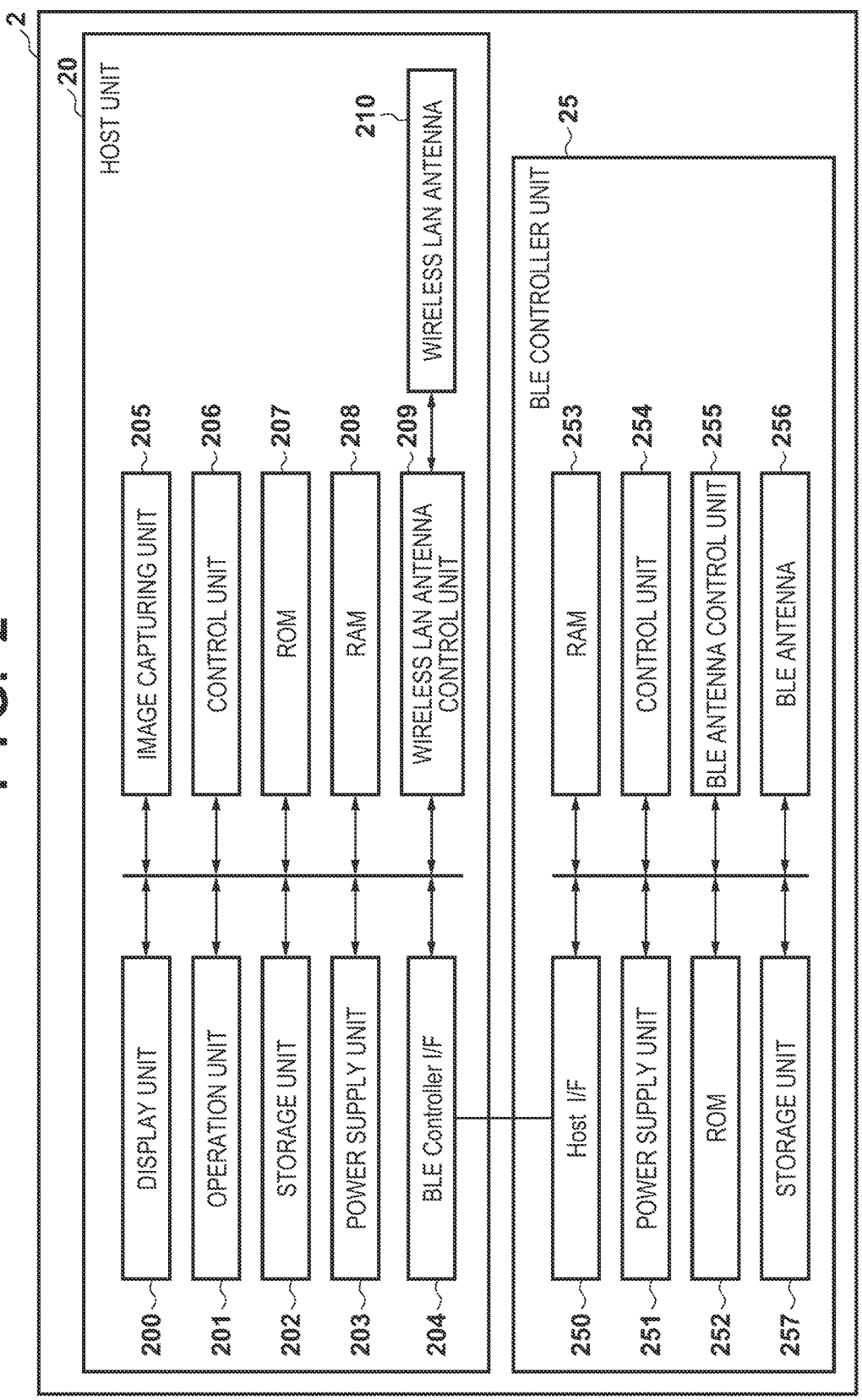
FIG. 2 is a block diagram showing an example of the hardware arrangement of a digital camera 2.

FIG. 2 shows an example of the hardware arrangement of the digital camera 2. The digital camera 2 has no components corresponding to the mobile network communication antenna control unit 111, the mobile network communication antenna 112, the GPS antenna control unit 113, and the GPS antenna 114 of FIG. 1, unlike the smartphone 1. The remaining components are the same as those of the smartphone 1 and a description thereof will be omitted.

Figure 3:
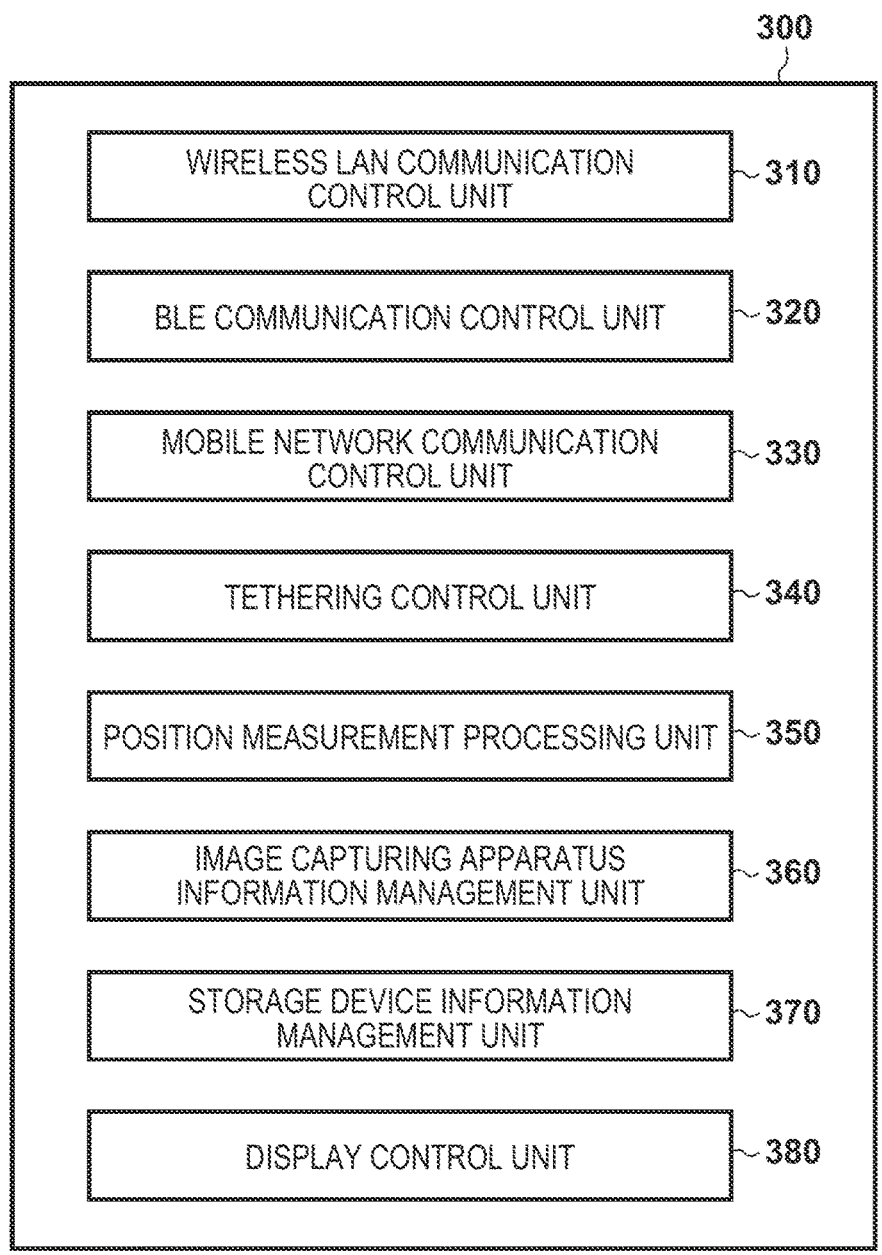
FIG. 3 is a block diagram showing an example of the functional arrangement of the smartphone 1.

The functional arrangement of the smartphone 1 will be described next with reference to FIG. 3. FIG. 3 shows an example of the functional arrangement of the smartphone 1. Note that in this embodiment, the functions of respective functional blocks shown in FIG. 3 are performed as software programs. However, some or all of the functional blocks may be implemented by hardware.

A wireless LAN communication control unit 310 controls wireless LAN communication via the wireless LAN antenna control unit 109. The wireless LAN communication control unit 310 is, for example, stored as a program in the ROM 107, and the function of the wireless LAN communication control unit 310 is performed when the control unit 106 executes the program.

A BLE communication control unit 320 controls BLE communication via the BLE antenna control unit 155. The BLE communication control unit 320 is, for example, stored as a program in the ROM 152, and the function of the BLE communication control unit 320 is performed when the control unit 154 executes the program.

A mobile network communication control unit 330 controls mobile network communication via the mobile network communication antenna control unit 111. The mobile network communication control unit 330 is, for example, stored as a program in the ROM 107, and the function of the mobile network communication control unit 330 is performed when the control unit 106 executes the program.

A tethering control unit 340 performs relay processing (tethering processing) between wireless LAN communication via the wireless LAN antenna control unit 109 and mobile network communication via the mobile network communication antenna control unit 111. When starting the tethering processing, the tethering control unit 340 instructs the wireless LAN communication control unit 310 to operate as an access point (AP) of a wireless LAN. When ending the tethering processing, the tethering control unit 340 instructs the wireless LAN communication control unit 310 to stop the AP function of the wireless LAN. The tethering control unit 340 is, for example, stored as a program in the ROM 107, and the function of the tethering control unit 340 is performed when the control unit 106 executes the program.

A position measurement processing unit 350 measures the current position of the smartphone 1. The position measurement processing unit 350 has a function of analyzing a GPS signal acquired via the GPS antenna control unit 113, and calculating information of the latitude/longitude at which the smartphone 1 exists. The position measurement processing unit 350 has a function of acquiring, from an external server apparatus or the like, a position at which the network exists, based on network information of a wireless LAN acquired via the wireless LAN communication control unit 310. Furthermore, the position measurement processing unit 350 has a function of storing a specific position in association with a specific UUID (Universally Unique Identifier), and determining, as the current position, a position stored when the UUID is acquired via the BLE communication control unit 320. The position measurement processing unit 350 integrates the pieces of information acquired by these functions, and continuously measures the current position of the smartphone 1. The position measurement processing unit 350 is, for example, stored as a program in the ROM 107, and the function of the position measurement processing unit 350 is performed when the control unit 106 executes the program.

Note that the position measurement processing unit 350 may measure the current position of the smartphone 1 using a function other than the above-described functions. For example, the position measurement processing unit 350 may measure the current position of the smartphone 1 using a device such as a barometer, an acceleration sensor, or a communication device using visible light or an acoustic wave. The position measurement processing unit 350 may measure the current position of the smartphone 1 by measuring the radio field intensity of wireless LAN communication, BLE communication, or mobile phone network communication having a specific identifier. Alternatively, the position measurement processing unit 350 may measure the current position of the smartphone 1 by combining one or more of the above measurement methods.

An image capturing apparatus information management unit 360 registers/manages information of an image capturing apparatus (in the communication system 500 shown in FIG. 5, the digital camera 2) with which the smartphone 1 communicates. The image capturing apparatus information management unit 360 has a function of managing the identifier of an image capturing apparatus, and determining whether the image capturing apparatus having the identifier can perform communication via the BLE communication control unit 320. Furthermore, the image capturing apparatus information management unit 360 has a function of acquiring the activation state (standby state or normal state) of the image capturing apparatus, and storing it. An example of the identifier of the image capturing apparatus managed by the image capturing apparatus information management unit 360 is a UUID. The image capturing apparatus information management unit 360 is, for example, stored as a program in the ROM 107, and the function of the image capturing apparatus information management unit 360 is performed when the control unit 106 executes the program.

A storage device information management unit 370 registers/manages information of a storage device (in the communication system 500 shown in FIG. 5, the NAS 3) to which the image capturing apparatus managed by the image capturing apparatus information management unit 360 transmits a captured image. The storage device information management unit 370 has a function of managing the identifier of a storage device, and acquiring and storing the free capacity and activation state (standby state or normal state) of the storage device having the identifier. An example of the identifier of the storage device managed by the storage device information management unit 370 is a UUID. The storage device information management unit 370 is, for example, stored as a program in the ROM 107, and the function of the storage device information management unit 370 is performed when the control unit 106 executes the program.

A display control unit 380 executes display control for the display unit 100. The display control unit 380 is, for example, stored as a program in the ROM 107, and the function of the display control unit 380 is performed when the control unit 106 executes the program.

The normal state (a state in which the power consumption of the apparatus is high) and the standby state (a state in which the power consumption of the apparatus is low) of the image capturing apparatus and storage device (corresponding to the digital camera 2 and the NAS 3, respectively, in this embodiment) will now be described.

Table 1 shows the states of the respective functions of the image capturing apparatus in the normal state and standby state of the image capturing apparatus.

TABLE 1

|  | Normal State | Standby State |
| --- | --- | --- |
| Wireless LAN Communication | enable | disable |
| Image Capturing | enable | disable |
| Screen Display | enable | disable |
| Image Data Access (Especially, Read) | enable | disable |
| Predetermined LED | ON | OFF |
| Host CPU | ON | OFF |

As shown in Table 1, the wireless LAN communication function is usable in the normal state and unusable in the standby state. The image capturing function is usable in the normal state and unusable in the standby state. The screen display function is usable in the normal state and unusable in the standby state. The image data access function especially related to a read operation is usable in the normal state and unusable in the standby state. The LED (Light-Emitting Diode) is ON in the normal state and OFF in the standby state. Note that the LED is not limited to OFF in the standby state, and variations such as a change in brightness and a change in color to reduce the power consumption are possible. The host CPU (corresponding to a control unit 206 in this embodiment) is ON in the normal state and OFF in the standby state. Note that as for the host CPU, the operation in the normal state/standby state may be defined by assuming that a clock frequency is high/low, a possible processing amount per unit time is large/small, or the power consumption is high/low, instead of ON/OFF.

Table 2 shows the states of the respective functions of the storage device in the normal state and standby state of the storage device.

TABLE 2

|  | Normal State | Standby State |
|---|---|---|
| Host CPU | ON | OFF |
| Image Data Access (Especially, Write) | enable | disable |
| Storage Unit (For Example, HDD) | ON | OFF |
| Predetermined LED | ON | OFF |
| Wireless LAN Communication (If Wireless LAN Function is Provided) | enable | disable |

The host CPU that controls the respective functions of the storage device is ON in the normal state and OFF in the standby state. Note that various operations in the normal state/standby state can be defined for the host CPU, similarly to the image capturing apparatus. The image data access function especially related to a write operation is usable in the normal state and unusable in the standby state. The storage unit (for example, an HDD (Hard Disc Drive)) that stores image data is ON in the normal state and OFF in the standby state. The LED is ON in the normal state and OFF in the standby state. Note that various operations are possible for the LED in the standby state, similarly to the image capturing apparatus. If the wireless LAN function is provided, the wireless LAN communication function is usable in the normal state and unusable in the standby state.

Note that as for wireless LAN communication, in the standby state, each of the image capturing apparatus and the storage device may be set in a state in which it is possible to receive only a wireless LAN packet in a specific format that requests activation of the image capturing apparatus/storage device. Furthermore, in each of the image capturing apparatus and the storage device, when the user is notified, by, for example, a display means, that wireless LAN communication is usable/unusable/in progress, the user can recognize whether image data can or cannot be uploaded or is being uploaded.

Figure 4:
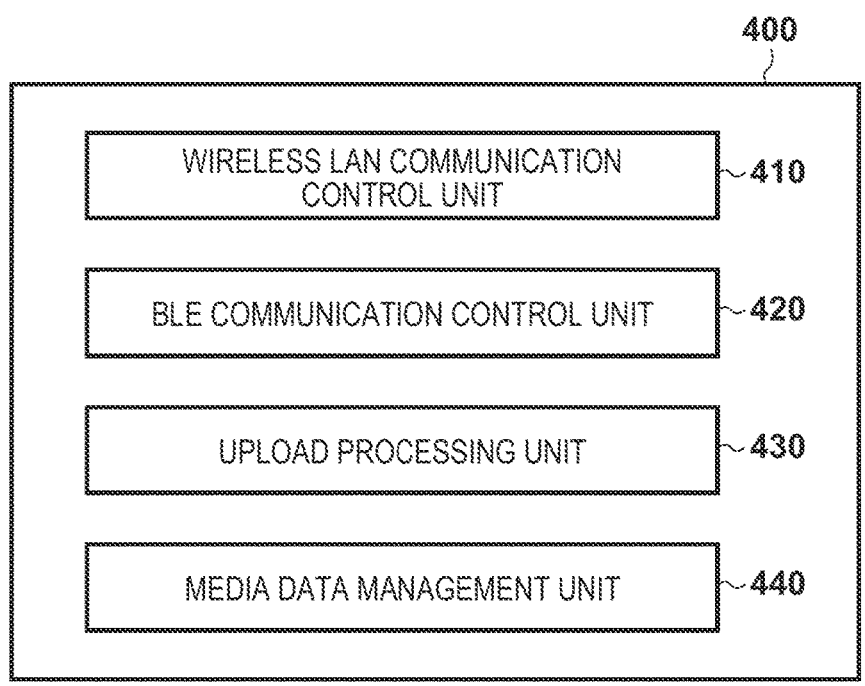
FIG. 4 is a block diagram showing an example of the functional arrangement of the digital camera 2.

The functional arrangement of the digital camera 2 will be described with reference to FIG. 4. FIG. 4 shows an example of the functional arrangement of the digital camera 2. Note that in this embodiment, the functions of respective functional blocks shown in FIG. 4 are performed as software programs. However, some or all of the functional blocks may be implemented by hardware.

A wireless LAN communication control unit 410 controls wireless LAN communication via a wireless LAN antenna control unit 209. The wireless LAN communication control unit 410 is, for example, stored as a program in a ROM 207, and the function of the wireless LAN communication control unit 410 is performed when the control unit 206 executes the program.

A BLE communication control unit 420 controls BLE communication via a BLE antenna control unit 255. The BLE communication control unit 420 is, for example, stored as a program in a ROM 252, and the function of the BLE communication control unit 420 is performed when a control unit 254 executes the program.

An upload processing unit 430 transmits, to an external apparatus via the wireless LAN communication control unit 410, media data (media file) captured by an image capturing unit 205 and stored in a storage unit 202. The upload processing unit 430 is, for example, stored as a program in the ROM 207, and the function of the upload processing unit 430 is performed when the control unit 206 executes the program.

A media data management unit 440 manages the media data captured by the image capturing unit 205 and stored in the storage unit 202. The media data management unit 440 stores information indicating whether the media data stored in the storage unit 202 has been transmitted to the external apparatus via the upload processing unit 430. The media data management unit 440 is, for example, stored as a program in the ROM 207, and the function of the media data management unit 440 is performed when the control unit 206 executes the program.

An operation procedure executed by the smartphone 1 existing within the predetermined range to perform upload control (to be referred to as automatic upload processing hereinafter) of the media data stored in the digital camera 2 will be described next with reference to flowcharts shown in FIGS. 6 to 9B. Note that in the embodiment to be described below, the media data (media file) captured and stored by the digital camera 2 will be referred to as image data. However, this is merely an example, and the embodiment to be described below is applicable to video data or data with audio.

FIG. 6 shows the operation procedure of the smartphone 1 when performing the automatic upload processing. Processing shown in FIG. 6 starts when, for example, the user operates the operation unit 101 of the smartphone 1 to instruct the smartphone 1 to start the automatic upload processing.

First, the smartphone 1 registers information necessary for the automatic upload processing, such as the image capturing apparatus (digital camera 2) in which the image data to be automatically uploaded is stored, the position/range of a location where the automatic upload processing is to be performed, the storage device (NAS 3) as an automatic upload destination, and a network connected to the NAS 3 (step S601). Note that in this embodiment, the location where the automatic upload processing is to be performed is the house of the user having the smartphone 1. Details of step S601 will be described later with reference to FIGS. 7A and 7B. If the registration processing in step S601 has failed (NO in step S602), the smartphone 1 ends the processing shown in FIG. 6. If the registration processing in step S601 has succeeded (YES in step S602), the smartphone 1 repeats processes in steps S603 to S609 until the automatic upload processing is stopped by a user operation (until YES is determined in step S609).

The smartphone 1 monitors whether image data (untransmitted image data) which has not been transmitted to the NAS 3 exists in the digital camera 2 (step S603). This processing is implemented when, for example, the image capturing apparatus information management unit 360 of the smartphone 1 monitors flag information that is included in an Advertise packet transmitted by the BLE communication control unit 420 of the digital camera 2 and indicates the presence/absence of untransmitted data. If it is determined that untransmitted image data exists (YES in step S604), the position measurement processing unit 350 of the smartphone 1 determines whether the current position of the smartphone 1 falls within the range of the house registered in step S601 as the location where the automatic upload processing is to be performed (step S605). Details of the processing in step S605 will be described later with reference to FIG. 8.

If, as a result of determination in step S605, the position measurement processing unit 350 determines that the smartphone 1 falls within the range of the house registered in step S601, for example, the user having the smartphone 1 has returned home (YES in step S606), the smartphone 1 instructs the digital camera 2 as the image capturing apparatus registered in step S601 to upload the image data (step S608). For example, if, in the repeatedly executed determination processing in step S605, it is determined that the position of the smartphone 1 falls outside the house when executing the determination processing last time and it is determined that the position of the smartphone 1 falls within the house when executing the determination processing this time, the position measurement processing unit 350 of the smartphone 1 can determine that the user has returned home. Details of the processing in step S608 will be described later with reference to FIGS. 9A and 9B.

If the position measurement processing unit 350 determines that the smartphone 1 falls outside the range of the house registered in step S601, for example, the user having the smartphone 1 has not returned home (NO in step S606), the smartphone 1 determines whether the user has performed an upload operation of the image data to the digital camera 2 via the operation unit 101 (step S607). If it is determined that the user has performed the upload operation (YES in step S607), the smartphone 1 instructs the digital camera 2 registered in step S601 to upload the image data (step S608); otherwise (NO in step S607), the smartphone 1 does not instruct the digital camera 2 to upload the image data.

Upon completion of the upload instruction processing in step S608, the smartphone 1 determines whether the user has performed an operation of stopping the automatic upload processing using the operation unit 101 (step S609). If it is determined that the user has not performed the stop operation (NO in step S609), the smartphone 1 repeats the processes in steps S603 to S609; otherwise (YES in step S609), the smartphone 1 ends the processing shown in FIG. 6. Note that the determination processing in step S609 may be performed without any user operation. For example, the determination processing in step S609 may be performed by the smartphone 1 in response to an instruction from the digital camera 2.

Figure 7A:
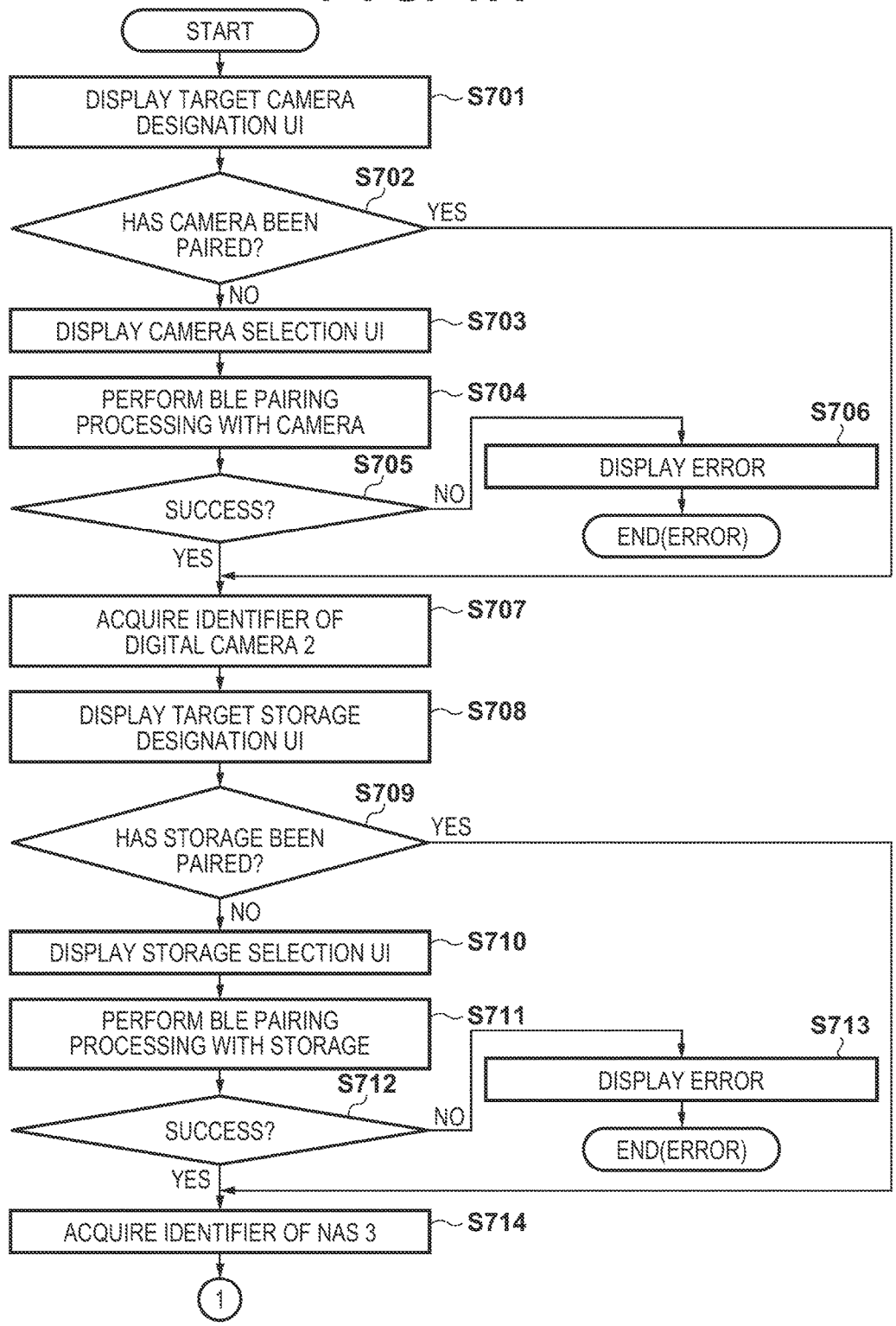
FIGS. 7A and 7B are flowcharts illustrating the operation procedure of processing in step S601 of FIG. 6 according to the first embodiment.
Figure 7B:
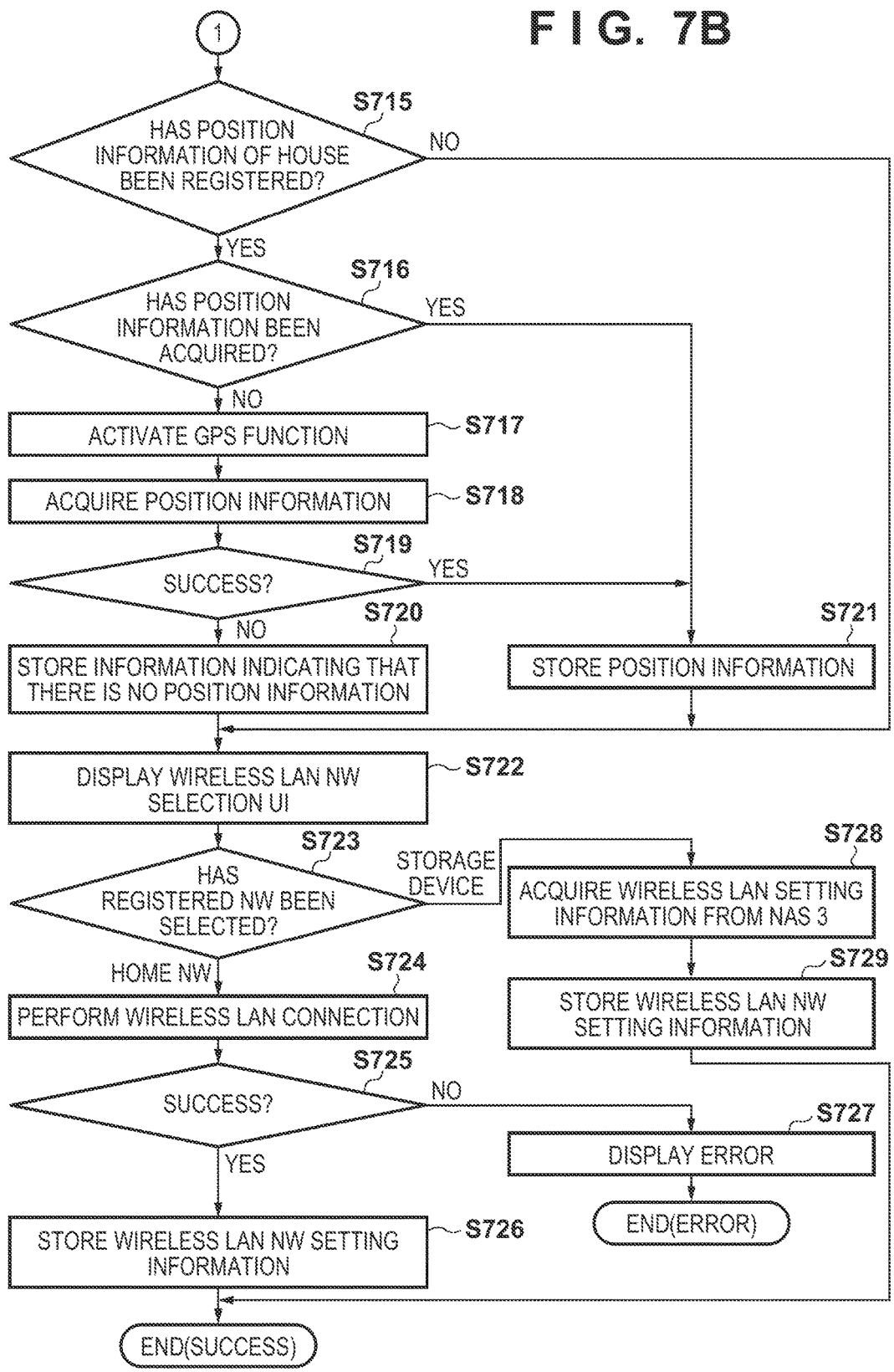

Next, the processing in step S601 of FIG. 6 will be described with reference to FIGS. 7A and 7B. FIGS. 7A and 7B show the operation procedures of the processing (step S601) of registering the information necessary for the automatic upload processing according to this embodiment.

In step S701, the display control unit 380 displays, on the display unit 100, a screen (target camera designation UI (User Interface)) for designating the image capturing apparatus (digital camera 2) storing the image data. This screen displays, for example, a list of image capturing apparatuses that have been paired with the smartphone 1 by BLE communication and are managed by the image capturing apparatus information management unit 360, and a menu screen for newly pairing an image capturing apparatus by BLE communication.

If the digital camera 2 has been paired with the smartphone by BLE communication (YES in step S702), the user selects the digital camera 2 from the list of the paired image capturing apparatuses displayed on the display unit 100. Subsequently, the image capturing apparatus information management unit 360 acquires the identifier information of the digital camera 2, and stores it (step S707). In this embodiment, the acquisition processing is performed when, for example, the BLE communication control unit 320 transmits a message to request the digital camera 2 of the identifier information using a BLE message, and receives a response message. Note that the acquisition processing may be performed in the smartphone 1 by another means/procedure. For example, the user may input the identifier of the digital camera 2 by operating the operation unit 101 of the smartphone 1. In this embodiment, the identifier information of the digital camera 2 is a UUID, but other information may be used instead of the UUID. For example, address information of wireless LAN communication or BLE communication, a model name, the nickname of the apparatus set by the user, or the like may be used.

If the digital camera 2 has not been paired with the smartphone 1, and the user newly registers the digital camera 2 (NO in step S702), the BLE communication control unit 320 searches for peripheral devices with which the smartphone 1 can communicate by BLE, and the display control unit 380 displays information (camera selection UI) of the found peripheral devices on the display unit 100 (step S703). The peripheral devices displayed on the display unit 100 may be all devices found in the BLE communication search processing. The BLE communication control unit 320 may acquire the models and names of the found devices, and select peripheral devices for which the automatic upload processing can be performed, and the display control unit 380 may display the selected peripheral devices on the display unit 100.

Subsequently, if the user operates the operation unit 101 to select the digital camera 2 from the peripheral devices displayed on the display unit 100 in step S703, the image capturing apparatus information management unit 360 attempts BLE pairing processing via the BLE communication control unit 320 for the digital camera 2 selected by the user (step S704). If the pairing processing has succeeded (YES in step S705), the image capturing apparatus information management unit 360 acquires, via the BLE communication control unit 320, the identifier information from the digital camera 2 selected by the user, and stores it (step S707). The identifier information is acquired using, for example, a request message complying with the BLE GATT (Generic Attribute) profile specification. If the pairing processing has failed (NO in step S705), the display control unit 380 displays an error message on the display unit 100 (step S706), and determines that the search/registration processing has failed, thereby ending the processing shown in FIGS. 7A and 7B.

Upon completion of the identifier acquisition/storage processing (step S707) of the digital camera 2, the display control unit 380 displays, on the display unit 100, a screen (target storage designation UI) for designating the storage device (NAS 3) to which the image data captured and stored by the digital camera 2 is to be uploaded (step S708). This screen displays, for example, a list of storage devices that have been paired by BLE communication and are managed by the storage device information management unit 370, and a menu screen for newly registering a storage device.

If the NAS 3 has been paired with the smartphone 1 by BLE communication (YES in step S709), the user selects the NAS 3 from the list of the paired storage devices displayed on the display unit 100. Subsequently, the storage device information management unit 370 acquires, via the BLE communication control unit 320, identifier information from the NAS 3 selected by the user, and stores it (step S714). In this embodiment, the acquisition processing is performed when, for example, the BLE communication control unit 320 transmits a message to request the NAS 3 of the identifier information using a BLE message, and receives a response message. Note that the acquisition processing may be performed in the smartphone 1 by another means/procedure. For example, the user may input the identifier of the NAS 3 by operating the operation unit 101 of the smartphone. In this embodiment, the identifier information of the NAS 3 is a UUID, but other information may be used instead of the UUID. For example, address information of wireless LAN communication or BLE communication, a model name, the nickname of the device set by the user, or the like may be used.

If the NAS 3 has not been paired with the smartphone 1, and the user newly registers the NAS 3 (NO in step S709), the BLE communication control unit 320 searches for peripheral devices with which the smartphone 1 can communicate by BLE, and the display control unit 380 displays information (storage selection UI) of the found peripheral devices on the display unit 100 (step S710). The peripheral devices displayed on the display unit 100 may be all devices found in the BLE communication search processing. The BLE communication control unit 320 may acquire the models and names of the found devices, and select peripheral devices having the network storage function, and the display control unit 380 may display the selected peripheral devices on the display unit 100.

Subsequently, if the user operates the operation unit 101 to select the NAS 3 from the peripheral devices displayed on the display unit 100 in step S710, the storage device information management unit 370 attempts BLE pairing processing via the BLE communication control unit 320 for the NAS 3 selected by the user (step S711). If the pairing processing has succeeded (YES in step S712), the storage device information management unit 370 acquires, via the BLE communication control unit 320, the identifier information from the NAS 3 selected by the user, and stores it (step S714). The identifier information is acquired using, for example, a request message complying with the BLE GATT profile specification. If the pairing processing has failed (NO in step S712), the display control unit 380 displays an error message on the display unit 100 (step S713), and determines that the search/registration processing has failed, thereby ending the processing shown in FIGS. 7A and 7B.

Upon completion of the identifier acquisition/storage processing (step S714) of the NAS 3, the smartphone 1 prompts the user to determine whether to register the position information of the house. For example, the display control unit 380 displays, on the display unit 100, a message to prompt the user to select whether to register the position information of the house. In the example of FIGS. 7A and 7B, assume that the current position information (for example, the latitude/longitude) of the smartphone 1 is measured by the GPS satellite 9. If the user has performed an operation of registering the position of the house (YES in step S715), the position measurement processing unit 350 attempts to acquire the current position information of the smartphone 1 via the GPS antenna control unit 113 (steps S716 to S721). If the user has performed an operation not to register the position of the house (NO in step S715), the processing (steps S716 to S721) is not executed.

If the position measurement processing unit 350 has activated a position information acquisition function by GPS, and acquired the position information of the smartphone 1 (YES in step S716), the position information is stored as the position of the house (step S721). If the position measurement processing unit 350 has not acquired the position information of the smartphone 1, for example, the position measurement processing unit 350 has not activated the position information acquisition information by GPS (NO in step S716), the position measurement processing unit 350 starts a GPS function (step S717), and attempts to acquire the position information of the smartphone 1 via the GPS antenna control unit 113 (step S718). If acquisition of the position information has succeeded (YES in step S719), the position measurement processing unit 350 stores the position as the position of the house (step S721); otherwise (NO in step S719), the position measurement processing unit 350 stores information indicating that there is no position information of the house (step S720).

Subsequently, the display control unit 380 displays, on the display unit 100, a screen (wireless LAN NW selection UI) for selecting a wireless LAN network to be used by the digital camera 2 to upload the image data to the NAS 3 (step S722). This screen includes, for example, a list of wireless LAN networks (home NWs) found/detected by the wireless LAN communication control unit 310, and a menu indicating that a wireless LAN network generated/managed by the NAS 3 serving as an access point is to be used.

If the user selects the menu indicating that the wireless LAN network generated/managed by the NAS 3 is to be used ("storage device" in step S723), the BLE communication control unit 320 acquires setting information of the wireless LAN network generated by the NAS 3 by performing BLE communication using the identifier information of the NAS 3 acquired in step S714 (step S728). The acquired setting information includes an SSID (Service Set Identifier), a BSSID (Basic Service Set Identifier), an encryption type, an encryption key, and an authentication type. The storage device information management unit 370 acquires the setting information via the BLE communication control unit 320, and stores it as wireless LAN network information to be used for the automatic upload processing (step S729).

If the user selects one wireless LAN network from the home NWs ("home NW" in step S723), the wireless LAN communication control unit 310 attempts to perform connection to the selected wireless LAN network (step S724). If the connection has succeeded (YES in step S725), the storage device information management unit 370 stores setting information of the wireless LAN network as wireless LAN network information to be used for the automatic upload processing (step S726).

If the wireless LAN communication control unit 310 has failed to perform connection to the wireless LAN network (NO in step S725), the display control unit 380 displays an error message on the display unit 100 (step S727), and the smartphone 1 determines that the search/registration processing has failed, thereby ending the processing shown in FIGS. 7A and 7B. At this time, the storage device information management unit 370 may discard the identifier information and position information stored in the processing of FIGS. 7A and 7B. Upon completion of the processing (step S726 or S729) of storing the setting information of the wireless LAN network, the smartphone 1 successfully ends the search/registration processing shown in FIGS. 7A and 7B.

Note that the steps of the operation procedure shown in FIGS. 7A and 7B may be performed in an arbitrary order. For example, before acquiring the pieces of identifier information of the digital camera 2 and the NAS 3, the smartphone 1 may acquire the position information of itself.

Figure 8:
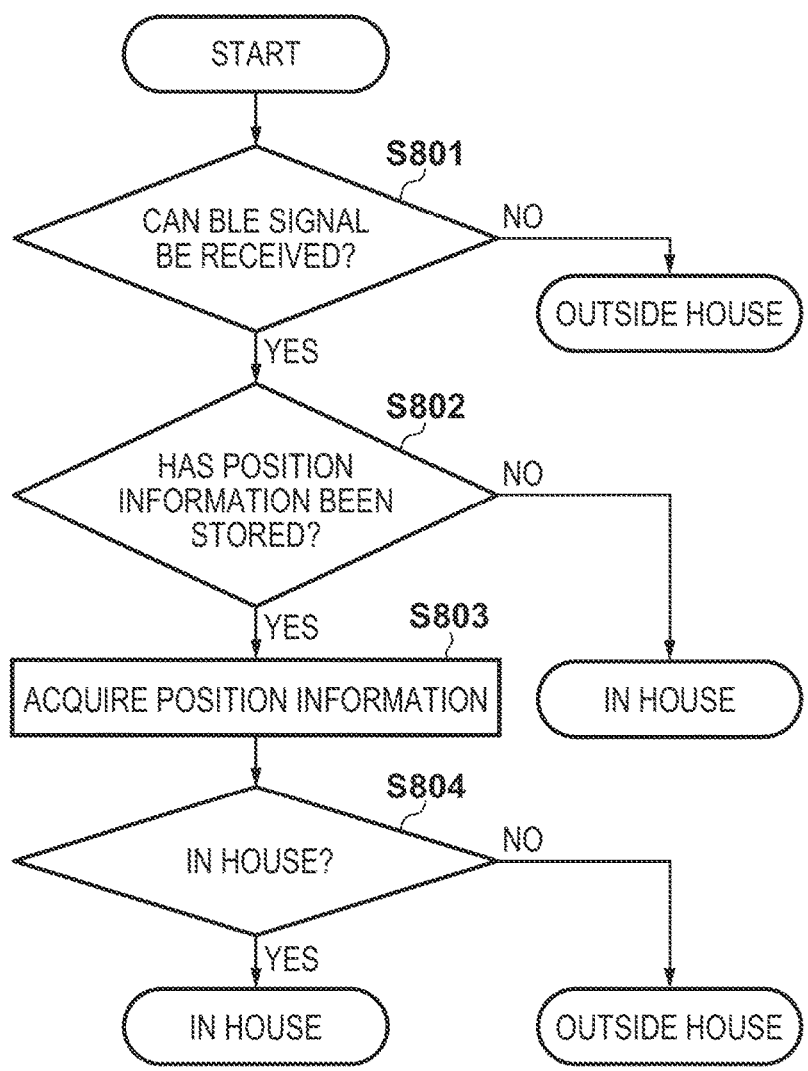
FIG. 8 is a flowchart illustrating the operation procedure of processing in step S605 of FIG. 6 according to the first embodiment.

The processing in step S605 of FIG. 6 will be described next with reference to FIG. 8. FIG. 8 shows the operation procedure of the processing (step S605) of determining whether the smartphone 1 exists in the house according to this embodiment. Note that as described above, in this embodiment, the NAS 3 is stationarily installed in the house of the smartphone 1.

First, the position measurement processing unit 350 determines whether it is possible to receive, via the BLE communication control unit 320, a BLE signal (Advertise packet) transmitted by the NAS 3 (step S801). If it is impossible to receive a BLE signal transmitted by the NAS 3 (NO in step S801), the position measurement processing unit 350 determines that the smartphone 1 is located outside the house, thereby ending the processing; otherwise (YES in step S801), it is determined whether the position information of the house has been stored in step S721 of FIG. 7B (step S802).

If the position information of the house has not been stored (NO in step S802), the position measurement processing unit 350 determines that the smartphone 1 is located in the house, thereby ending the processing; otherwise (YES in step S802), the position measurement processing unit 350 acquires the current position information (for example, the latitude/longitude) of the smartphone 1 via the GPS antenna control unit 113 (step S803). Subsequently, the position measurement processing unit 350 compares the position information acquired in step S803 with that stored in step S721. If values indicated by the pieces of position information match or fall within a predetermined range (YES in step S804), it is determined that the smartphone 1 is located in the house, thereby ending the processing. On the other hand, if the values indicated by the pieces of position information fall outside the predetermined range (NO in step S804), the position measurement processing unit 350 determines that the smartphone 1 is located outside the house, thereby ending the processing.

Figure 9A:
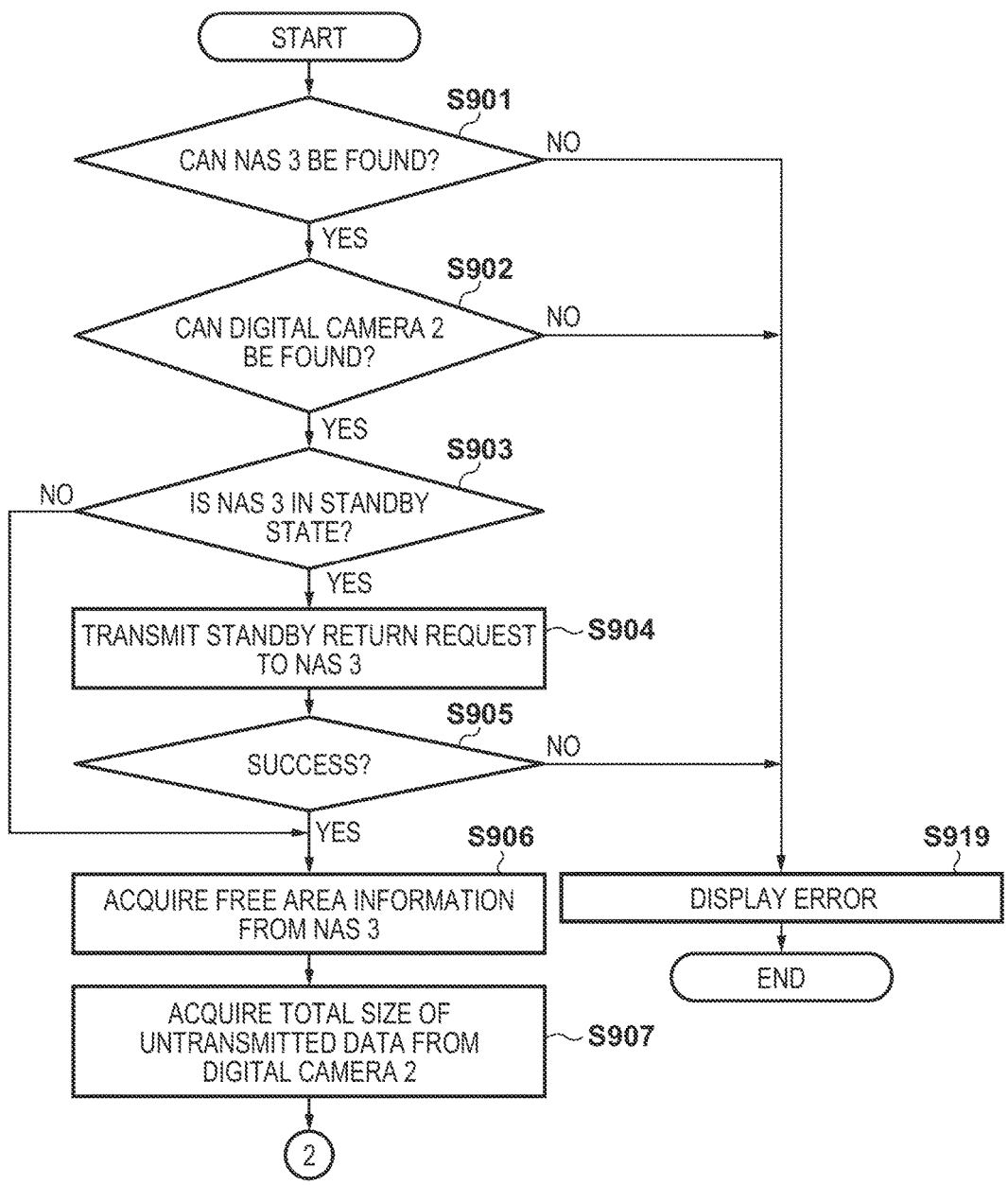
FIGS. 9A and 9B are flowcharts illustrating the operation procedure of processing in step S608 of FIG. 6 according to the first embodiment.
Figure 9B:
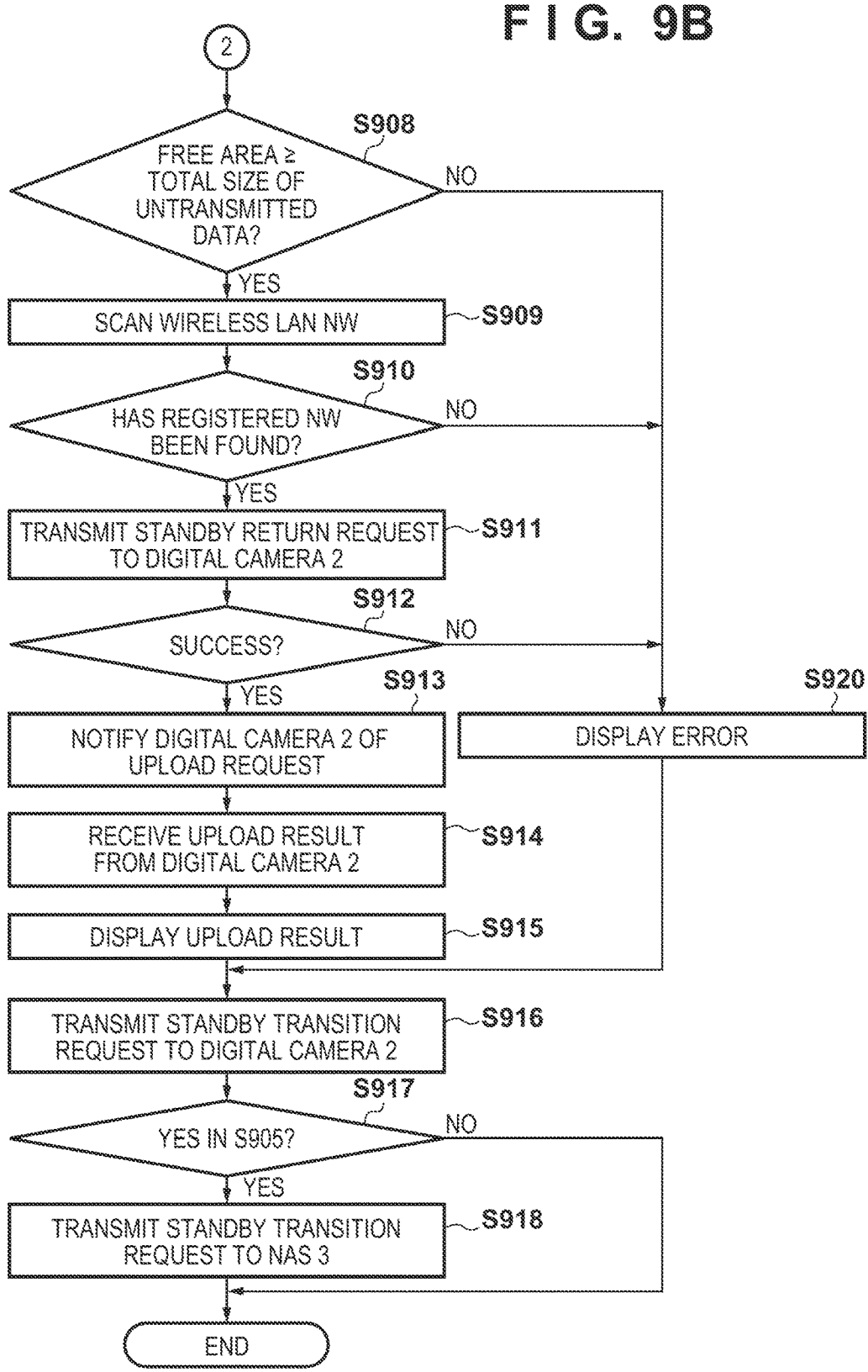

The processing in step S608 of FIG. 6 will be described next with reference to FIGS. 9A and 9B. FIGS. 9A and 9B show the operation procedures of the upload instruction processing (S608) by the smartphone 1 according to this embodiment. First, the BLE communication control unit 320 monitors the BLE Advertise packet transmitted by the NAS 3 corresponding to the identifier information acquired in step S714 of FIG. 7A, and searches for the NAS 3 (step S901). If the NAS 3 cannot be found (NO in step S901), the display control unit 380 displays an error message on the display unit 100 (step S919), thereby ending the upload instruction processing shown in FIG. 9A; otherwise (YES in step S901), the BLE communication control unit 320 monitors the BLE Advertise packet transmitted by the digital camera 2 corresponding to the identifier information acquired in step S707 of FIG. 7A, and searches for the digital camera 2 (step S902). If the digital camera 2 cannot be found (NO in step S902), the display control unit 380 displays an error message on the display unit 100 (step S919), thereby ending the upload instruction processing shown in FIG. 9A; otherwise (YES in step S902), the storage device information management unit 370 acquires state information from the NAS 3 by transmitting, for example, a GATT request message via the BLE communication control unit 320, and determines whether the NAS 3 is in the standby state (step S903).

If the NAS 3 is in the standby state (YES in step S903), the storage device information management unit 370 transmits a standby return request message to the NAS 3 via the BLE communication control unit 320 (step S904), and waits for a response from the NAS 3 (step S905). The transmitted standby return request message is, for example, a request message complying with the GATT profile specification. If a message indicating that the NAS 3 has failed to return from the standby state is received from the NAS 3 (NO in step S905), the display control unit 380 displays an error message on the display unit 100 (step S919), thereby ending the upload instruction processing shown in FIG. 9A.

If a message indicating that the NAS 3 has successfully returned from the standby state is received as a response from the NAS 3 (YES in step S905), the storage device information management unit 370 transmits, for example, a GATT request message via the BLE communication control unit 320, and acquires the free area (free capacity) of a storage area from the NAS 3 (step S906). Subsequently, the image capturing apparatus information management unit 360 transmits, for example, a GATT request message via the BLE communication control unit 320, and acquires the total size of the untransmitted image data, that is included in a response message transmitted as a response from the digital camera 2 (step S907). If the free area of the NAS 3 is equal to or larger than the total size of the untransmitted image data (YES in step S908), the wireless LAN communication control unit 310 attempts to scan and find the wireless LAN network based on the setting information of the wireless LAN network stored in step S726 or S729 of FIG. 7B (step S909).

If the wireless LAN network has been found (YES in step S910), the image capturing apparatus information management unit 360 transmits a standby return request message to the digital camera 2 via the BLE communication control unit 320 (step S911), and waits for a response from the digital camera 2 (step S912). The transmitted standby return request message is, for example, a request message complying with the GATT profile specification. Note that when performing the processing in step S911, similarly to step S903, the smartphone 1 acquires a state from the digital camera 2, and determines whether the digital camera 2 is in the standby state. If the digital camera 2 is in the standby state, the smartphone 1 may transmit the standby return request message to the digital camera 2. If the digital camera 2 is in the normal state, the smartphone 1 need not transmit the standby return request message to the digital camera 2.

If a message indicating that the digital camera 2 has successfully returned from the standby state is received (YES in step S912), the image capturing apparatus information management unit 360 transmits an upload request (image data transmission request) message to the digital camera 2 via the BLE communication control unit 320 (step S913). This message includes, for example, data representing that upload of the untransmitted image data is requested, the identifier (for example, the UUID) of the NAS 3, and the setting information (SSID, BSSID, encryption type, encryption key, authentication type, and the like) of the wireless LAN network stored in step S726 or S729. This message is, for example, a request message complying with the GATT profile specification.

Subsequently, the image capturing apparatus information management unit 360 waits for a response message including an upload result to the upload request message (step S914). Upon receiving the response message, the display control unit 380 displays, on the display unit 100, the result of the upload processing in the digital camera 2, that is included in the message (step S915). If the response message is not received within a predetermined time, the user may confirm the position of the smartphone 1 or the processing may restart from step S901.

If the free area of the NAS 3 is smaller than the total size of the untransmitted image data (NO in step S908), or the scan of the wireless LAN network has failed (NO in step S910), the smartphone 1 does not instruct the digital camera to perform the upload processing. Similarly, if the digital camera 2 has failed to return from the standby state (NO in step S912), the smartphone 1 does not instruct the digital camera 2 to perform the upload processing. In these cases, the display control unit 380 displays, on the display unit 100, a message indicating that the smartphone has failed to perform the automatic upload processing of the digital camera (step S920).

Upon completion of the upload processing, the image capturing apparatus information management unit 360 transmits a standby transition request message to the digital camera 2 via the BLE communication control unit 320 (step S916). If the standby return request message is transmitted to the NAS 3 in step S904 and YES is determined in step S905 (YES in step S917), the storage device information management unit 370 transmits a standby transition request message to the NAS 3 via the BLE communication control unit 320 (step S918). The transmitted standby transition request message is, for example, a request message complying with the GATT profile specification. Note that when performing the processing in step S916, similarly to step S917, if the smartphone 1 has transmitted no standby return request message to the digital camera 2, the smartphone 1 need not transmit the standby transition request message to the digital camera 2.

The operation of the digital camera 2 will be described next with reference to FIGS. 10 and 11. FIGS. 10 and 11 are flowcharts each illustrating the operation of the digital camera 2 according to the first embodiment of the present invention.

FIG. 10 shows an operation procedure when the BLE communication control unit 420 of the digital camera 2 receives a BLE message from the smartphone. First, the BLE communication control unit 420 determines the type of the received BLE message (step S1001). If the received message is the standby return request message transmitted from the smartphone 1 in step S904 of FIG. 9A ("standby return request" in step S1001), the BLE communication control unit 420 confirms the state of the power supply of a Host unit 20 (step S1002). If the power supply of the Host unit 20 is in an OFF state (YES in step S1002), the BLE communication control unit 420 turns on the power supply of the Host unit 20 via a Host I/F 250 (step S1003), and notifies the smartphone 1 that the digital camera 2 has returned from the standby state to the normal state (step S1004). The notification is made using, for example, a notification message complying with the GATT profile specification, and includes data representing the success/ failure of the processing of turning on the power supply of the Host unit 20. If the power supply of the Host unit 20 is in an ON state (NO in step S1002), the BLE communication control unit 420 transmits, to the smartphone 1, for example, a GATT notification message indicating that the digital camera 2 has returned from the standby state to the normal state (step S1004).

If the message received from the smartphone 1 is the upload request message transmitted from the smartphone 1 in step S913 of FIG. 9B ("upload request" in step S1001), the media data management unit 440 determines whether there is image data (untransmitted image data) that has not been transmitted to the external storage device (step S1005). If there is no untransmitted image data (NO in step S1005), the BLE communication control unit notifies, using, for example, a GATT notification message, the smartphone 1 of an upload result indicating the completion of the upload processing (step S1014).

If there is the untransmitted image data (YES in step S1005), the wireless LAN communication control unit 410 attempts to perform connection to the wireless LAN network instructed by the received upload request message (step S1006). If the connection has failed (NO in step S1007), the BLE communication control unit notifies, using, for example, a GATT notification message, the smartphone 1 of an upload result indicating the failure of the upload processing (step S1013). If the connection has succeeded (YES in step S1007), the upload processing unit 430 attempts to perform login processing to the NAS 3 corresponding to the identifier information (for example, the UUID) designated by the upload request message (step S1008). The login processing is executed using, for example, HTTPS (Hyper Text Transfer Protocol Secure) communication via the wireless LAN communication control unit 410.

If the login processing has failed (NO in step S1009), the BLE communication control unit notifies, using, for example, a GATT notification message, the smartphone 1 of an upload result indicating the failure of the upload processing (step S1013). If the login processing has succeeded (YES in step S1009), the upload processing unit 430 transmits the untransmitted image data to the NAS 3 to which the login processing has been performed (step S1010). This transmission processing is executed using, for example, HTTP (Hyper Text Transfer Protocol) communication via the wireless LAN communication control unit 410. If the upload processing has failed (NO in step S1011), the BLE communication control unit notifies, using, for example, a GATT notification message, the smartphone 1 of an upload result indicating the failure of the upload processing (step S1013). If the upload processing has succeeded (YES in step S1011), the BLE communication control unit 420 notifies, using, for example, a GATT notification message, the smartphone 1 of an upload result indicating the success of the upload processing (step S1012).

If the received message is the standby transition request message transmitted from the smartphone 1 in step S916 of FIG. 9B ("standby transition request" in step S1001), the BLE communication control unit 420 confirms the state of the power supply of the Host unit 20 (step S1015). If the power supply of the Host unit 20 is in the ON state (YES in step S1015), the BLE communication control unit 420 turns off the power supply of the Host unit 20 via the Host I/F 250 (step S1016), and notifies the smartphone 1 that the digital camera 2 is in the standby state (step S1017). This notification is made using, for example, a notification message complying with the GATT profile specification, and includes data representing the success/failure of the processing of turning off the power supply of the Host unit 20. If the power supply of the Host unit 20 is in the OFF state (NO in step S1015), the smartphone is notified using, for example, a GATT notification message that the digital camera 2 is in the standby state (step S1017).

The processing of managing the presence/absence of untransmitted image data by the digital camera 2 will be described next with reference to FIG. 11. FIG. 11 shows the operation procedure of the processing of managing the presence/absence of untransmitted image data by the media data management unit 440 of the digital camera 2. First, the media data management unit 440 monitors whether image capturing processing has been performed in the digital camera 2 (step S1101). If the image capturing processing has been performed (YES in step S1101), untransmitted image data has been generated by the image capturing processing, and thus the media data management unit 440 requests the BLE communication control unit 420 to transmit a BLE message indicating that there is the untransmitted image data (step S1102). The BLE message is, for example, an Advertise packet defined by BLE, and is set with a flag representing the presence/absence of untransmitted image data. It can be configured that the setting of the presence/absence of untransmitted image data is stored in a storage unit 257 of a BLE Controller unit 25, and the BLE message is periodically transmitted even if the power supply of the Host unit 20 is in the OFF state. The media data management unit 440 calculates an untransmitted image data size, and sets it in the storage unit 257 (step S1103). Upon receiving a GATT message from the smartphone 1 to acquire the total size of the untransmitted image data, the BLE communication control unit 420 transmits a response message including the untransmitted image data size (corresponding to step S907 of FIG. 9A). The processing of transmitting the response message can be executed even if the power supply of the Host unit 20 is in the OFF state.

If no image capturing processing has been performed (NO in step S1101), the media data management unit 440 monitors whether image data upload processing has been performed in the digital camera 2 (step S1104). If the image upload processing has been performed (YES in step S1104), the media data management unit 440 subtracts the size of the uploaded image data, and sets the thus obtained untransmitted image data size in the storage unit 257 (step S1105). If all the untransmitted image data have been uploaded (YES in step S1106), the media data management unit 440 requests the BLE communication control unit 420 to transmit a BLE message indicating that there is no untransmitted image data (step S1107). The BLE message is, for example, an Advertise packet defined by BLE, in which the flag representing the presence/absence of the untransmitted image data is cleared.

An example of a communication sequence among the devices in the communication system 500 shown in FIG. 5 will be described in detail next with reference to FIGS. 12 to 14B.

FIG. 12 shows an example of a communication sequence when the user performs an operation of starting the automatic upload processing by the digital camera 2 by operating the operation unit 101 of the smartphone 1. The operation of the smartphone 1 in the communication sequence shown in FIG. 12 corresponds to the operation procedure shown in FIGS. 7A and 7B.

If the user performs an operation of starting the automatic upload processing by the digital camera 2 by operating the operation unit 101 of the smartphone 1 (S1201), the BLE communication control unit 320 of the smartphone 1 performs BLE pairing processing with the digital camera 2 (S1202, step S704). Subsequently, the BLE communication control unit 320 of the smartphone 1 acquires the identifier (for example, the UUID) of the digital camera 2 using a BLE GATT request message (S1203, step S707). Next, the BLE communication control unit 320 of the smartphone 1 performs BLE pairing processing with the NAS 3 (S1204, step S711). Subsequently, the BLE communication control unit 320 of the smartphone 1 acquires the identifier (for example, the UUID) of the NAS 3 using a BLE GATT request message (S1205, step S714). Next, the position measurement processing unit 350 of the smartphone 1 activates the GPS function (S1206, step S717), and receives a GPS signal transmitted by the GPS satellite 9 (S1207, step S718). The position measurement processing unit 350 of the smartphone 1 calculates (acquires) position information (for example, the latitude/longitude) from the received GPS signal, and stores it (S1208, step S721). Next, using a BLE GATT request message, the BLE communication control unit 320 of the smartphone 1 acquires, from the NAS 3, the setting information of the wireless LAN network generated by the NAS 3 (S1209, step S728). The acquired setting information is managed/stored by the storage device information management unit 370 (S1210, step S729).

Figure 13:
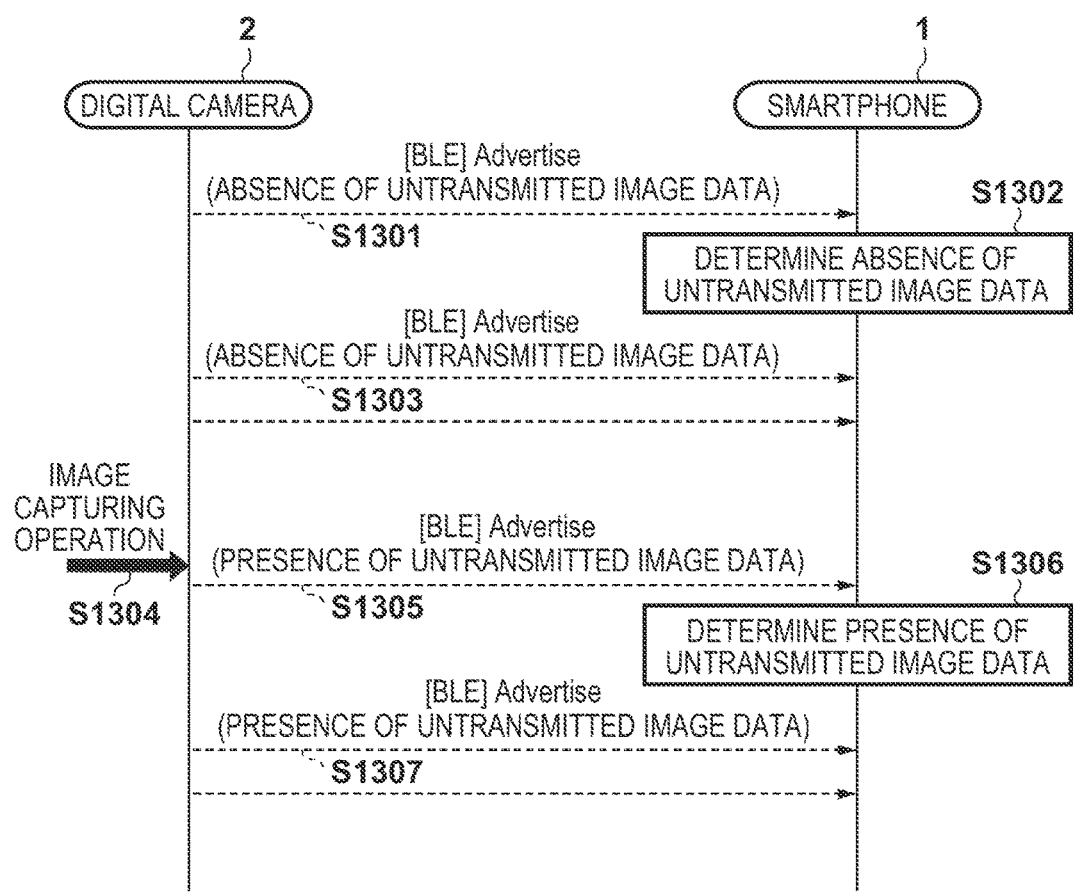
FIG. 13 is a sequence chart showing an example of a communication sequence when the digital camera 2 performs image capturing processing according to the first embodiment.

FIG. 13 shows an example of a communication sequence when the user performs image capturing processing by operating an operation unit 201 of the digital camera 2.

In an initial state, the absence of untransmitted image data is set in the storage unit 257 of the digital camera 2. The BLE communication control unit 420 transmits a BLE Advertise message indicating the absence of untransmitted image data (S1301). Upon receiving the message, the smartphone 1 determines that there is no untransmitted image data in the digital camera 2 (S1302). The BLE communication control unit 420 of the digital camera 2 periodically transmits the received Advertise message (S1303).

If image capturing processing is performed in the digital camera 2 (S1304), the BLE communication control unit 420 transmits a BLE Advertise message indicating that untransmitted image data has been generated by the image capturing processing (S1305). Upon receiving the message, the smartphone 1 determines that there is the untransmitted image data in the digital camera 2 (S1306). The BLE communication control unit 420 of the digital camera 2 periodically transmits a BLE Advertise message indicating the presence of the untransmitted image data (S1307).

Figure 14A:
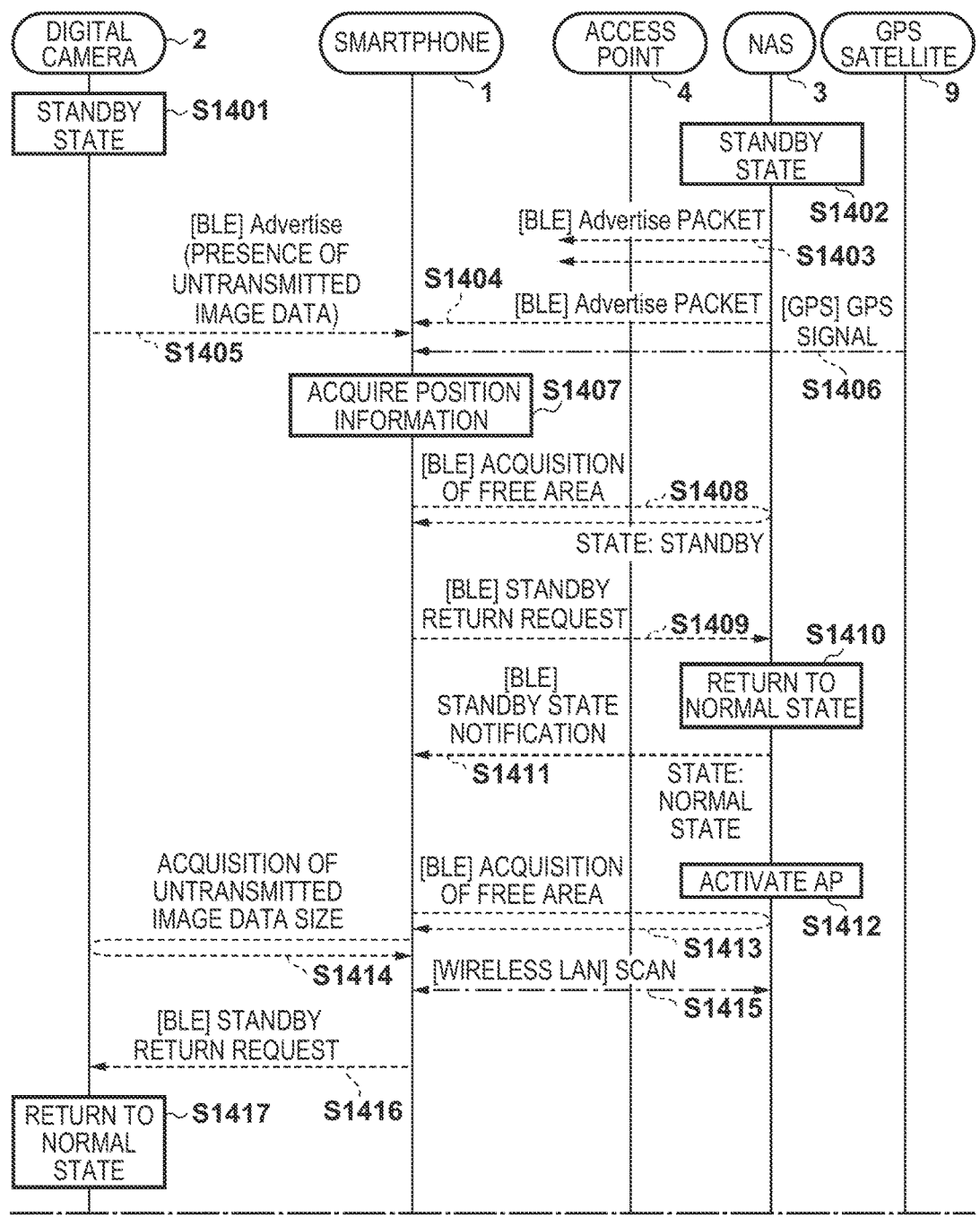
FIGS. 14A and 14B are sequence charts showing an example of a communication sequence when the user returns home with the smartphone 1 and the digital camera 2 according to the first embodiment.
Figure 14B:
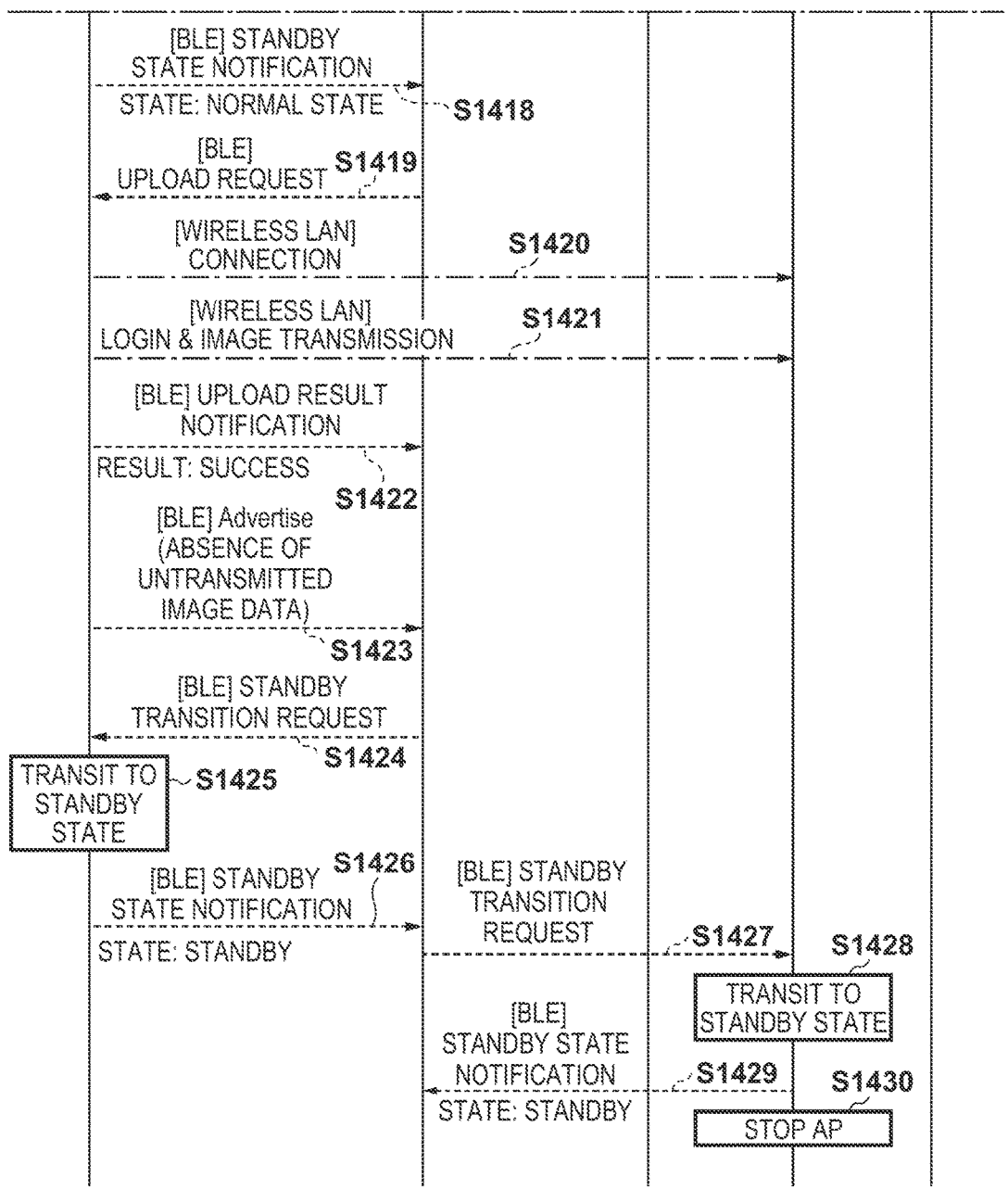

FIGS. 14A and 14B show examples of a communication sequence when the user returns home with the smartphone 1 and the digital camera 2. The operation of the smartphone 1 in the communication sequence shown in FIGS. 14A and 14B corresponds to the operation procedure shown in FIG. 9B.

In the initial state, the digital camera 2 and the NAS 3 are in the standby state (S1401, S1402), and are in a state in which it is impossible to perform wireless LAN communication. The NAS 3 periodically transmits a BLE Advertise packet including the identifier information (for example, the UUID) of itself (S1403). If the user returns home, the smartphone 1 enters the BLE communication range of the NAS 3, and the BLE communication control unit 320 of the smartphone 1 receives the Advertise packet transmitted from the NAS 3 (S1404, YES in step S901). The BLE communication control unit 420 of the digital camera 2 periodically transmits a BLE Advertise packet regardless of the ON/OFF state of the power supply of the Host unit 20 (S1405). The transmitted Advertise packet is set with, for example, a flag to represent that there is the untransmitted image data in the digital camera 2. The BLE communication control unit 320 of the smartphone 1 receives the Advertise packet transmitted from the digital camera 2 (YES in step S902).

Next, the position measurement processing unit 350 of the smartphone 1 receives a GPS signal transmitted by the GPS satellite 9 (S1406), and calculates (acquires) position information (for example, the latitude/longitude) from the received GPS signal (S1407). The storage device information management unit 370 of the smartphone 1 transmits a GATT request message via the BLE communication control unit 320, acquires state information as a response from the NAS 3, and determines whether the NAS 3 is in the standby state (S1408). As described above, since the NAS 3 is in the standby state, the storage device information management unit 370 transmits a standby return request message to the NAS 3 via the BLE communication control unit 320 (S1409, step S904). Upon receiving the message, the NAS 3 returns to the normal state (S1410), and transmits a GATT notification message representing that the NAS 3 has returned to the normal state (S1411, YES in step S905). Furthermore, the NAS 3 activates the access point function of itself (S1412), and generates a wireless LAN network.

Upon receiving, from the NAS 3, the GATT notification message representing that the NAS 3 has returned to the normal state, the storage device information management unit 370 of the smartphone 1 transmits a GATT request message via the BLE communication control unit 320, and acquires, as a response to it, the free area (free capacity) of the storage area from the NAS 3 (S1413, step S906). Furthermore, the image capturing apparatus information management unit 360 of the smartphone 1 transmits a GATT request message via the BLE communication control unit 320, and acquires, as a response to it, the total size of the untransmitted image data from the digital camera 2 (S1414, step S907). Assume that the free area of the NAS 3 is larger than the total size of the untransmitted image data of the digital camera 2 (YES in step S908).

Subsequently, the wireless LAN communication control unit 310 of the smartphone 1 scans the wireless LAN network generated by the NAS 3 (S1415, step S909). If the wireless LAN network has been found (YES in step S910), the image capturing apparatus information management unit 360 transmits a standby return request message to the digital camera 2 via the BLE communication control unit 320 (S1416, step S911). Upon receiving the message, the digital camera 2 returns to the normal state (S1417), turns on the power supply of the Host unit 20, and transmits a GATT notification message representing that the digital camera 2 has returned to the normal state (S1418). Upon receiving, from the digital camera 2, the GATT notification message representing that the digital camera 2 has returned to the normal state (YES in step S912), the image capturing apparatus information management unit 360 of the smartphone 1 transmits an upload request message to the digital camera 2 via the BLE communication control unit 320 (S1419, step S913). This message includes an upload request of the untransmitted image data, the identifier information (for example, the UUID) of the NAS 3, and the setting information (SSID, BSSID, encryption type, encryption key, authentication type, and the like) of the wireless LAN network generated/managed by the NAS 3. When the digital camera 2 receives the upload request message, the wireless LAN communication control unit 410 is connected to the NAS 3 by the wireless LAN using the wireless LAN network setting information included in the message (S1420). Subsequently, the upload processing unit 430 logs in to the NAS 3 corresponding to the identifier information (for example, the UUID) designated by the upload request message, transmits the untransmitted image data to the NAS via wireless LAN communication, and uploads the image data (S1421).

Upon completion of the upload processing, the BLE communication control unit 420 of the digital camera 2 notifies, using, for example, a GATT notification message, the smartphone 1 of an upload result indicating the success of the upload processing (S1422). Furthermore, the BLE communication control unit 420 transmits a BLE Advertise message indicating the absence of the untransmitted image data (S1423). This message is subsequently, periodically transmitted.

If the digital camera 2 notifies, by, for example, the GATT notification message, the smartphone 1 of the success of the upload processing, the image capturing apparatus information management unit 360 transmits a standby transition request message to the digital camera 2 via the BLE communication control unit 320 (S1424, step S916). Upon receiving the standby transition request message, the digital camera 2 turns off the power supply of the Host unit 20 to transit to the standby state (S1425), and notifies, using, for example, a GATT notification message, the smartphone 1 that the digital camera 2 has transited to the standby state (S1426). Subsequently, in the smartphone 1, the storage device information management unit 370 transmits a standby transition request message to the NAS 3 via the BLE communication control unit 320 (S1427, step S918). Upon receiving the standby transition request message, the NAS 3 transits to the standby state (S1428), and notifies, using, for example, a GATT notification message, the smartphone 1 that the NAS 3 has transited to the standby state (S1429). The NAS 3 stops the access point function activated in S1412 (S1430).

As described above, in this embodiment, when the smartphone 1 exists in the house as the predetermined range, if the digital camera 2 and the NAS 3 that can perform BLE communication are not in the normal state, they are returned to the normal state, and image data upload processing via a wireless LAN is instructed. This allows a plurality of apparatuses to be readily connected to each other using communication with low power consumption.

(Second Embodiment)

In the above-described first embodiment, a method using BLE communication as a communication means between the communication apparatus (smartphone 1) and the storage apparatus (NAS 3) has been exemplified. The second embodiment will explain a method using a wireless LAN as a communication means between a communication apparatus and a storage apparatus.

Figure 15:
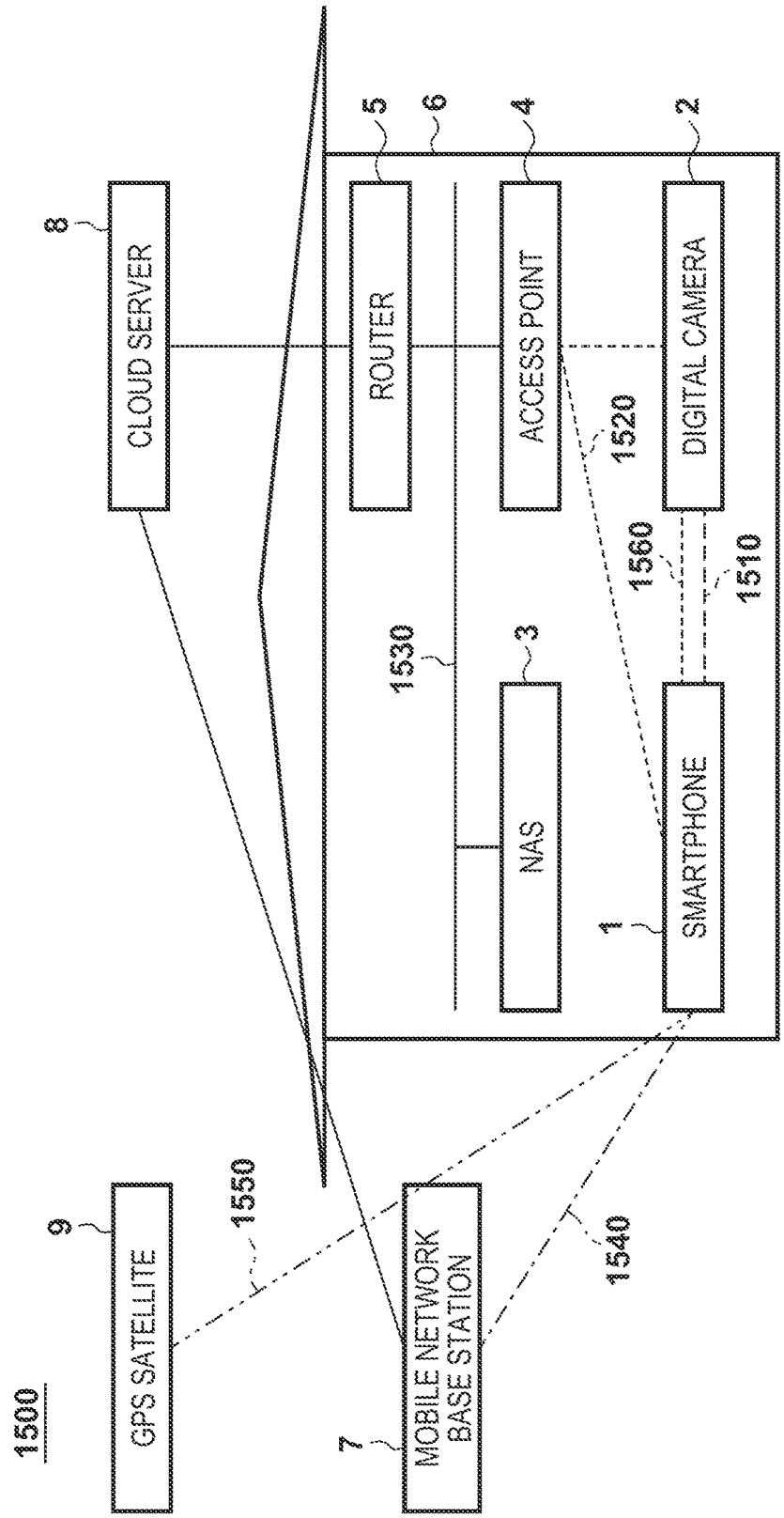
FIG. 15 is a block diagram showing an example of the arrangement of a communication system 1500 according to the second embodiment.

FIG. 15 shows a communication system 1500 assumed in the second embodiment. A smartphone 1 can be connected to a digital camera 2 via BLE communication 1510. In the BLE communication 1510, the digital camera 2 operates as a BLE peripheral device, and the smartphone 1 operates as a BLE central device. Furthermore, the smartphone 1 receives a GPS signal 1550 sent from a GPS satellite 9. The smartphone 1 can also perform communication with a mobile network base station 7 by public wireless communication 1540.

The smartphone 1 and the digital camera 2 can be connected to a wireless LAN network 1520 generated by an access point 4. A NAS 3, the access point 4, and a router 5 can be connected to each other by a wired LAN network 1530. The router 5 can be connected to a cloud server 8 on the Internet (a cloud environment). The digital camera 2 can be connected to the NAS 3 and the cloud server 8 via the access point 4. The digital camera 2 can be connected to a wireless LAN network 1560 generated by the smartphone 1, and connected to the cloud server 8 via the mobile network base station 7. Assume that the NAS 3, the access point 4, and the router 5 are stationarily installed in, for example, a house 6 of the user of the smartphone 1, and the smartphone 1 and the digital camera 2 are taken out of the house 6 and used by the user. Note that the smartphone 1, the digital camera 2, and the NAS 3 are examples for explaining this embodiment. The present invention is not limited to them, and any apparatuses that can create the network shown in FIG. 15 and have the following functions can be used.

The hardware arrangements and functional arrangements of the smartphone 1 and the digital camera 2 according to this embodiment are the same as those described with reference to FIGS. 1 to 4 in the first embodiment, and a description thereof will be omitted.

An overview of an operation of performing the automatic upload processing of the digital camera 2 in the smartphone 1 is the same as that described with reference to FIG. 6 in the first embodiment. However, details of registration processing, house determination processing, and upload instruction processing are different from those in steps S601, S605, S608 of FIG. 6 in the first embodiment, and will be described below with reference to FIGS. 16A to 18.

Figure 16A:
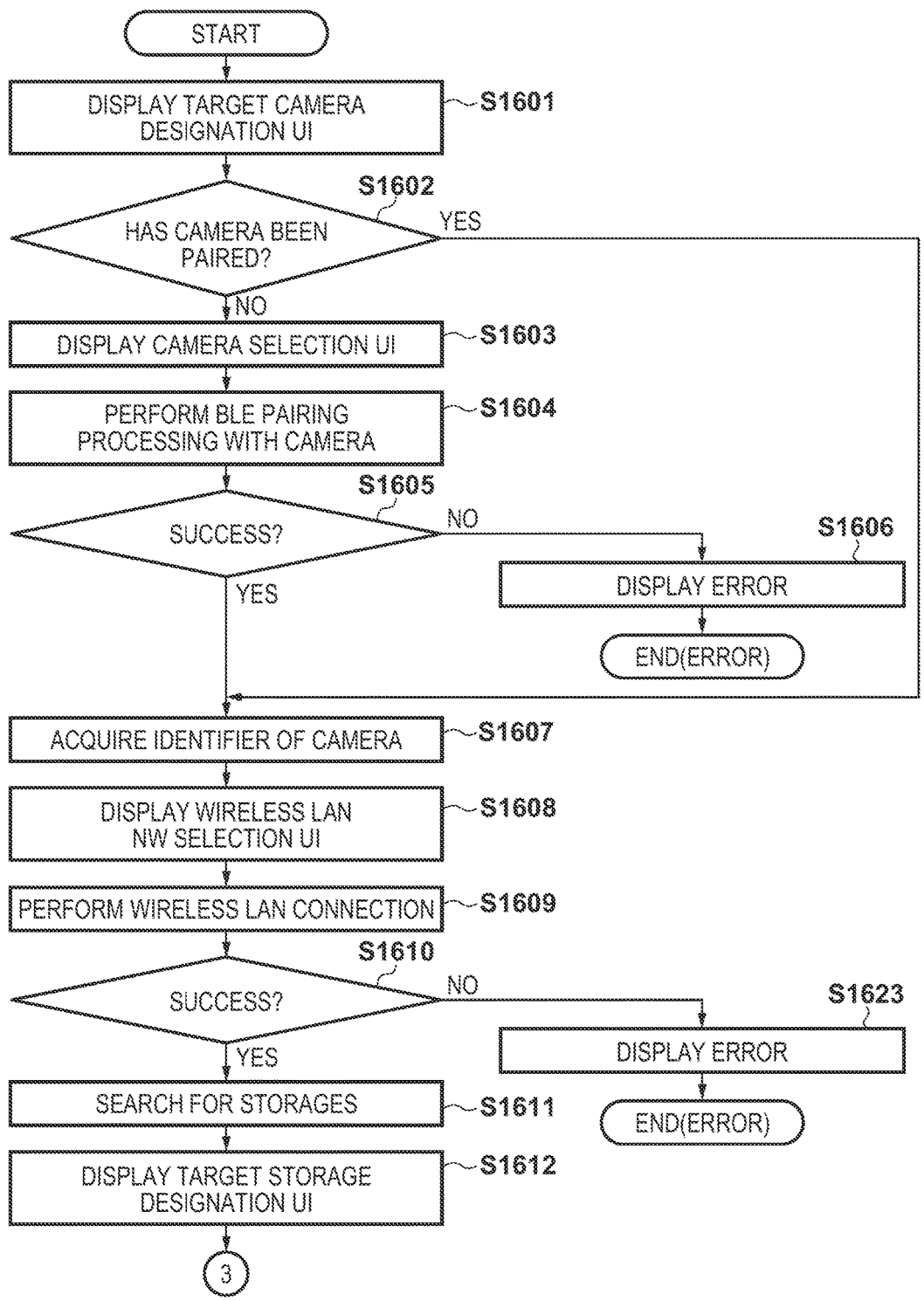
FIGS. 16A and 16B are flowcharts illustrating the operation procedure of processing in step S601 of FIG. 6 according to the second embodiment.
Figure 16B:
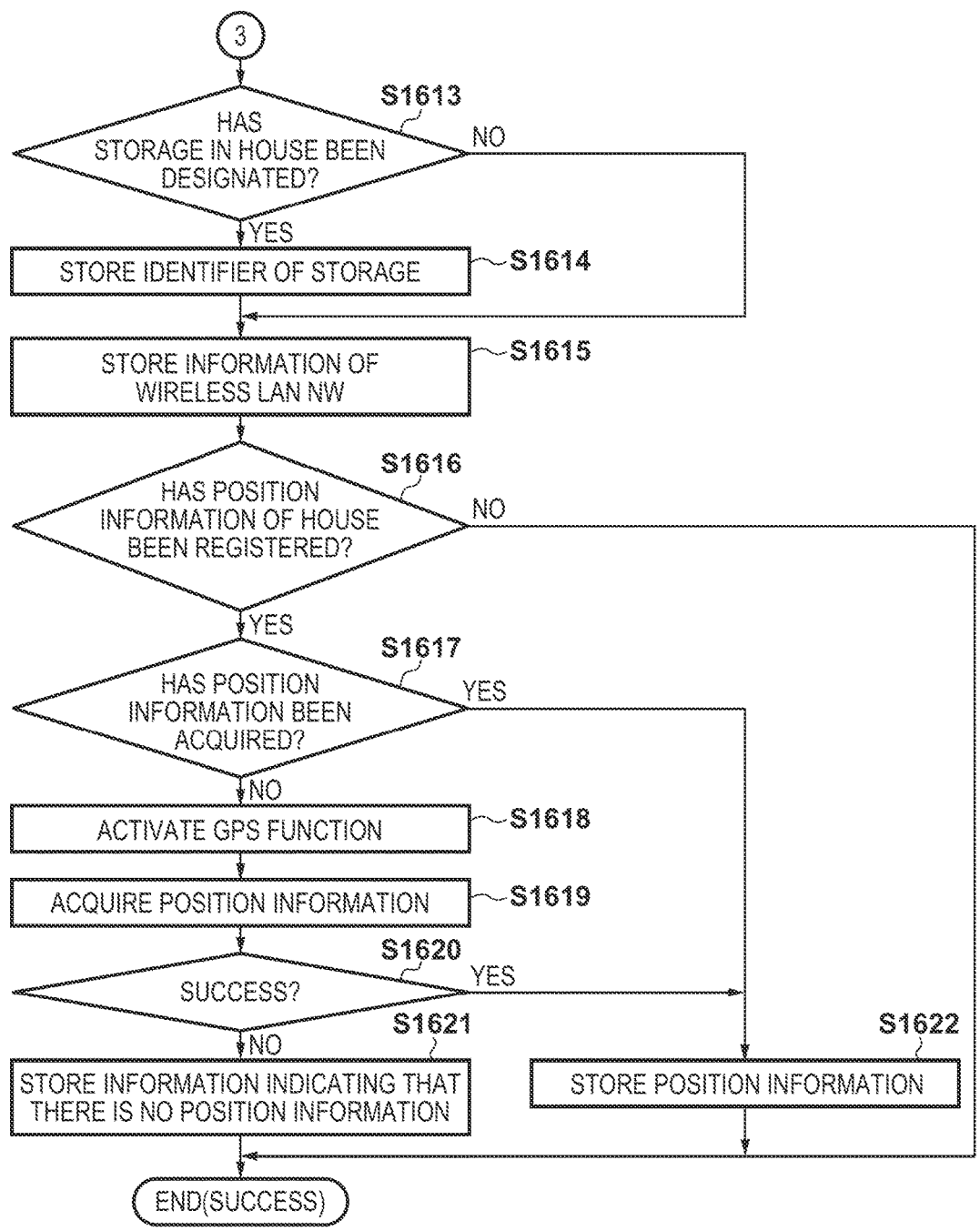

FIGS. 16A and 16B show the operation procedures of the processing (step S601) of registering information necessary for the automatic upload processing according to this embodiment. Note that processes in steps S1601 to S1607 are the same as those in steps S701 to S707 of FIG. 7A, and a description thereof will be omitted. Processes in step S1608 and subsequent steps will now be described in detail.

A display control unit 380 displays, on a display unit 100, a screen (wireless LAN NW selection UI) for selecting a wireless LAN network of the house 6 (step S1608). This screen displays, for example, a list of wireless LAN networks (home NWs) found/detected by the wireless LAN communication control unit 310. The user operates an operation unit 101 to select a wireless LAN network generated by the access point 4 installed in the house 6 from the list of the wireless LAN networks displayed on the display unit 100. Next, a wireless LAN communication control unit 310 attempts to perform connection to the wireless LAN network selected by the user (step S1609).

If the connection has failed (NO in step S1610), the display control unit 380 displays an error message on the display unit 100 (step S1623), and the smartphone 1 determines that the search/registering processing has failed, thereby ending the processing shown in FIGS. 16A and 16B. If the connection has succeeded (YES in step S1610), a storage device information management unit 370 searches for storage devices existing on the connected wireless LAN network (step S1611). In this embodiment, assume that the search processing is performed using SSDP (Simple Service Discovery Protocol). Note that the search processing may be performed using a means such as mDSN (Multicast Domain Name System).

The display control unit 380 displays, on the display unit 100, a screen (target storage designation UI) for selecting a storage device as an upload destination (step S1612). The screen displays, for example, a list of the storage devices found by the search processing in step S1611 and a list of cloud services supported by the camera. The user operates the operation unit 101 to select, from the lists displayed on the display unit 100, one or more destinations to which image data captured by the digital camera 2 are to be uploaded. If the user selects the NAS 3 in the house 6 (YES in step S1613), the storage device information management unit 370 stores the identifier information of the NAS 3 acquired by the search processing in step S1611 (step S1614). In this embodiment, the identifier information of the NAS 3 is a UUID. However, other information may be used instead of the UUID. For example, an IP address, a MAC address, a model name, the nickname of the device set by the user, or the like may be used. Subsequently, the storage device information management unit 370 stores the setting information of the wireless LAN network connected in step S1609 as wireless LAN network information to be used for the automatic upload processing (step S1615). The stored setting information includes the SSID, BSSID, encryption type, encryption key, and authentication type of the wireless LAN network. The smartphone 1 performs processing of registering the position information of the house 6 (steps S1616 to S1622). This processing is the same as that in steps S715 to S721 described above with reference to FIG. 7B and a description thereof will be omitted.

Figure 17:
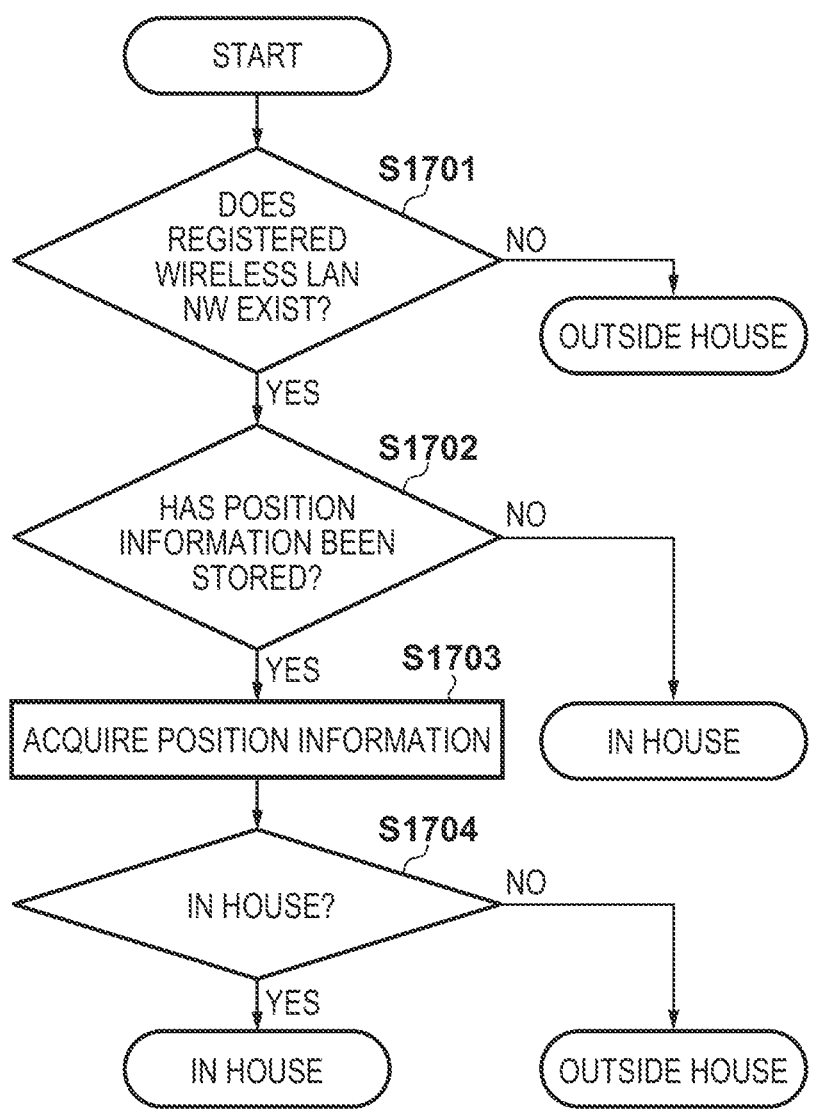
FIG. 17 is a flowchart illustrating the operation procedure of processing in step S605 of FIG. 6 according to the second embodiment.

FIG. 17 shows the operation procedure of the processing (step S605) of determining whether the smartphone 1 exists in the house 6 according to this embodiment. A position measurement processing unit 350 determines, via the wireless LAN communication control unit 310, whether the wireless LAN network corresponding to the setting information stored (registered) in step S1615 of FIG. 16B exists nearby (step S1701). If the network does not exist nearby (NO in step S1701), the position measurement processing unit 350 determines that the smartphone 1 is located outside the house 6, thereby ending the processing; otherwise (YES in step S1701), the storage device information management unit 370 determines whether the position information of the house 6 has been stored in step S1622 (step S1702). If no position information has been stored (NO in step S1702), the position measurement processing unit 350 determines that the smartphone 1 is located in the house 6, thereby ending the processing.

If the position information has been stored (YES in step S1702), the position measurement processing unit 350 acquires the current position information (for example, the latitude/longitude) of the smartphone via a GPS antenna control unit 113 (step S1703). The position measurement processing unit 350 compares the position information acquired in step S1703 with that stored in step S1622. If values indicated by the pieces of position information match or fall within a predetermined range (YES in step S1704), it is determined that the smartphone 1 is located in the house 6, thereby ending the processing. On the other hand, if the values indicated by the pieces of position information fall outside the predetermined range (NO in step S1704), the position measurement processing unit 350 determines that the smartphone is located outside the house 6, thereby ending the processing.

Figure 18A:
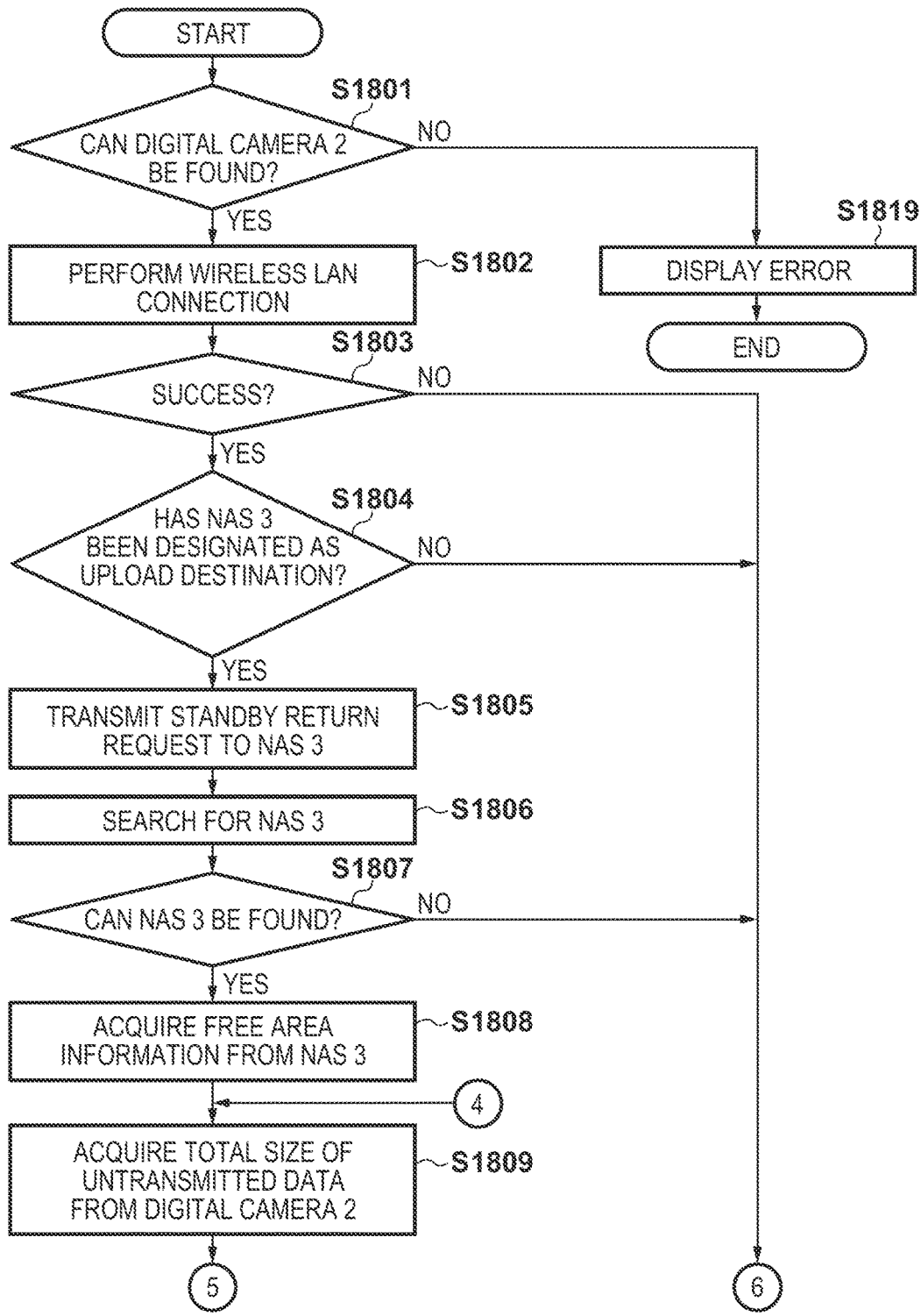
FIGS. 18A and 18B are flowcharts illustrating the operation procedure of processing in step S608 of FIG. 6 according to the second embodiment.
Figure 18B:
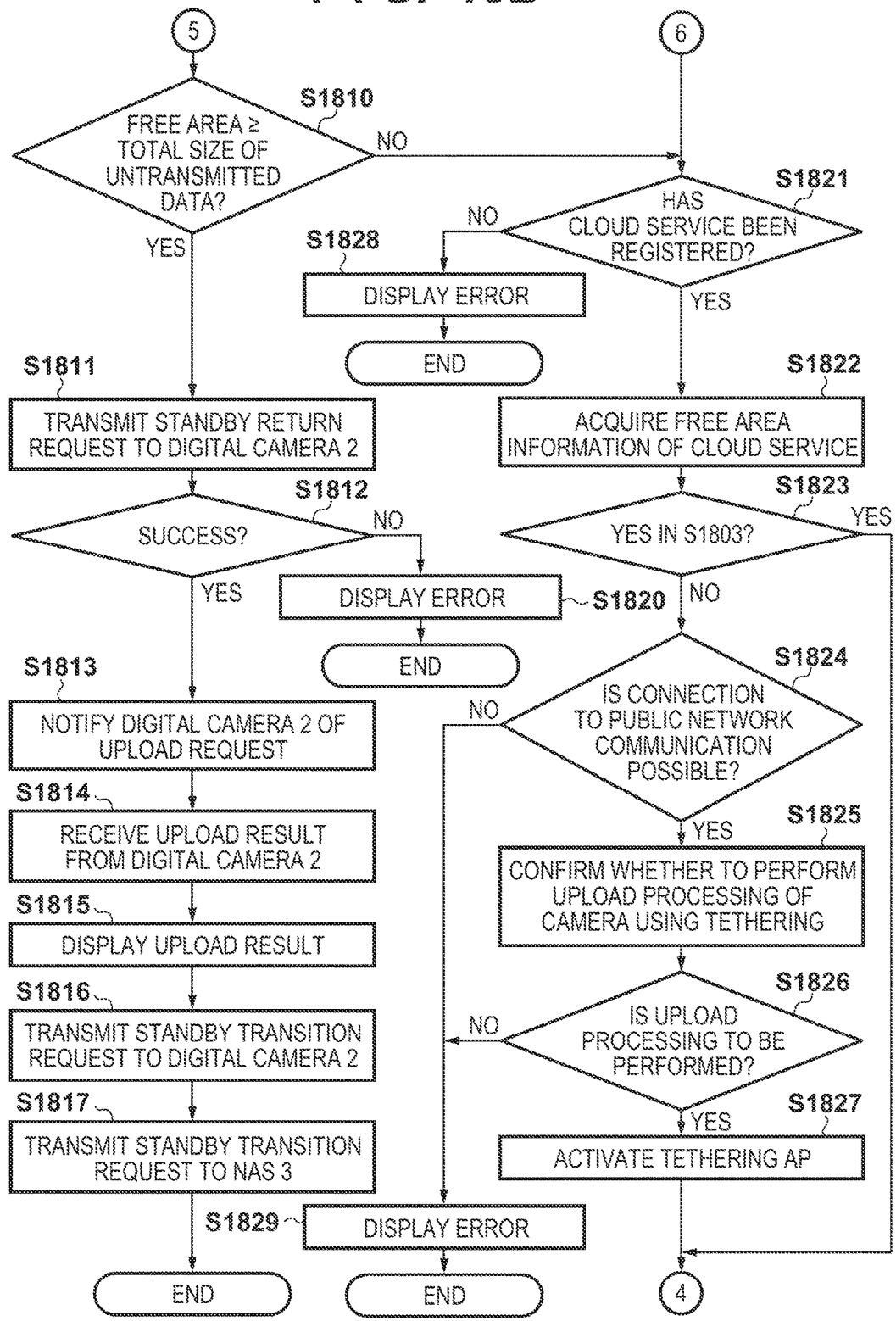

FIGS. 18A and 18B show the operation procedures of the upload instruction processing (step S608) by the smartphone 1 according to the embodiment. First, a BLE communication control unit 320 monitors a BLE Advertise packet transmitted by the digital camera 2, and searches for the digital camera 2 (step S1801). If the digital camera 2 cannot be found (NO in step S1801), the display control unit 380 displays an error message on the display unit 100 (step S1819), thereby ending the upload instruction processing shown in FIGS. 18A and 18B; otherwise (YES in step S1801), the wireless LAN communication control unit 310 attempts to perform connection to the wireless LAN network stored in step S1615 (step S1802). If the connection has succeeded (YES in step S1803), the storage device information management unit 370 determines whether the NAS 3 in the house 6 has been designated as an upload destination in step S1612 (step S1804). If the NAS 3 in the house 6 has been designated (YES in step S1804), the storage device information management unit 370 transmits a standby return request message to the NAS 3 via the wireless LAN communication control unit 310 (step S1805). In this embodiment, the message is, for example, a Wake-on-Lan® message. Note that when performing the processing in step S1805, similarly to step S903 of FIG. 9A described in the first embodiment, the smartphone 1 acquires a state from the NAS 3, and determines whether the NAS 3 is in the standby state. If the NAS 3 is in the standby state, the smartphone 1 may transmit the standby return request message to the NAS 3. If the NAS 3 is in the normal state, the smartphone 1 need not transmit the standby return request message to the NAS 3.

The storage device information management unit 370 searches for the NAS 3 on the wireless LAN network connected in step S1802 (step S1806). In this embodiment, the search processing is performed using, for example, SSDP. If the NAS 3 can be found (YES in step S1807), the storage device information management unit 370 acquires the free area (free capacity) of a storage area from the NAS 3 via the wireless LAN communication control unit 310 (step S1808). Subsequently, an image capturing apparatus information management unit 360 transmits, for example, a GATT request message via the BLE communication control unit 320, and acquires the total size of untransmitted image data from the digital camera 2 (step S1809). If the free area of the NAS 3 is equal to or larger than the untransmitted image data size (YES in step S1810), the image capturing apparatus information management unit 360 transmits a standby return request message to the digital camera 2 via the BLE communication control unit 320 (step S1811), and waits for a response from the digital camera 2 (step S1812). Note that when performing the processing in step S1811, similarly to step S903 of FIG. 9A described in the first embodiment, the smartphone 1 acquires a state from the digital camera 2, and determines whether the digital camera 2 is in the standby state. If the digital camera 2 is in the standby state, the smartphone 1 may transmit the standby return request message to the digital camera 2. If the digital camera 2 is in the normal state, the smartphone 1 need not transmit the standby return request message to the digital camera 2. If a message indicating that the digital camera 2 has failed to return from the standby state is received (NO in step S1812), the display control unit 380 displays, on the display unit 100, a message representing that the automatic upload processing of the digital camera 2 has failed (step S1820), thereby ending the processing.

If a message indicating that the digital camera 2 has successfully returned from the standby state is received (YES in step S1812), the image capturing apparatus information management unit 360 transmits an upload request message to the digital camera 2 via the BLE communication control unit 320 (step S1813). This message includes untransmitted image data upload request, the identifier information (for example, the UUID) of the NAS 3, and the wireless LAN network information (SSID, BSSID, encryption type, encryption key, authentication type, and the like) stored in step S1615. This message is, for example, a request message complying with the GATT profile specification. Subsequently, the image capturing apparatus information management unit 360 waits for a response message to the upload request message (step S1814), and displays the result of the upload processing in the digital camera 2 on the display unit 100 via the display control unit 380 (step S1815).

The image capturing apparatus information management unit 360 transmits a standby transition request message to the digital camera via the BLE communication control unit 320 (step S1816). Furthermore, the storage device information management unit 370 transmits a standby transition request message to the NAS 3 via the wireless LAN communication control unit 310 (step S1817). Note that when performing the processes in steps S1816 and S1817, similarly to step S917 of FIG. 9B described in the first embodiment, if the smartphone 1 has not transmitted the standby return request message to the digital camera 2/NAS 3, it need not transmit the standby transition request message to the digital camera 2/NAS 3.

If the wireless LAN connection has failed (NO in step S1803), the user has not selected the NAS 3 in the house 6 (NO in step S1804), the NAS 3 cannot be found (NO in step S1807), or the free area of the NAS 3 is insufficient (NO in step S1810), the smartphone 1 performs processes in step S1821 and subsequent steps. If the user has not designated a cloud service as an upload destination in step S1613 (NO in step S1821), the display control unit 380 displays, on the display unit 100, a message representing that the automatic upload processing of the digital camera 2 has failed (step S1828), thereby ending the processing.

If the user has designated a cloud service as an upload destination in step S1613 (YES in step S1821), the storage device information management unit 370 acquires the free area (free capacity) of a storage area from the cloud server 8 (step S1822). At this time, if the wireless LAN network connection has succeeded in step S1802, the smartphone 1 acquires the free area from the cloud server 8 via the wireless LAN network; otherwise, the smartphone 1 accruires the free area from the cloud server 8 via the public wireless communication 1540.

If the wireless LAN network connection has succeeded in step S1802 (YES in step S1823), the smartphone 1 performs processes in step S1809 and subsequent steps. At this time, the upload request message transmitted in step S1813 can include information for requesting to upload the untransmitted image data, the identification information of the cloud service, and the wireless LAN network information stored in step S1615.

If the wireless LAN network connection has failed in step S1802 (NO in step S1823), the tethering control unit 340 attempts to activate tethering processing. The tethering control unit 340 determines whether connection to the public wireless communication 1540 is possible (step S1824). If connection is impossible (NO in step S1824), the display control unit 380 displays, on the display unit 100, a message representing the automatic upload processing of the digital camera 2 has failed (step S1829), thereby ending the processing; otherwise (YES in step S1824), the tethering control unit 340 displays, on the display unit 100 via the display control unit 380, a message for confirming, with the user, whether to perform the automatic upload processing using a tethering function (step S1825). If the user performs an operation not to permit the use of the tethering function (NO in step S1826), the display control unit 380 displays, on the display unit 100, a message representing that the automatic upload processing of the digital camera has failed (step S1829), thereby ending the processing. If the user permits the use of the tethering function (YES in step S1826), the tethering control unit 340 activates the tethering function (step S1827). After that, the smartphone 1 performs processes in step S1809 and the subsequent steps. At this time, the upload request message transmitted in step S1813 can include information for requesting to upload the untransmitted image data, the identification information of the cloud service, and wireless LAN network information generated by the smartphone in step S1827.

The operation of the digital camera 2 according to this embodiment is the same as that exemplified in the first embodiment and a description thereof will be omitted.

Examples of a communication sequence among the devices in the communication system 1500 shown in FIG. 15 will be described in detail next with reference to FIGS. 19 to 21B.

FIG. 19 shows an example of a communication sequence for explaining processing when the user performs an operation of starting the automatic upload processing by the digital camera 2 by operating the operation unit 101 of the smartphone 1. The operation of the smartphone 1 in the communication sequence shown in FIG. 19 corresponds to the operation procedure shown in FIGS. 16A and 16B.

If the user performs an operation of starting the automatic upload processing by the digital camera 2 by operating the operation unit 101 of the smartphone 1 (S1901), the BLE communication control unit 320 of the smartphone 1 performs BLE pairing processing with the digital camera 2 (S1902, step S1604). Subsequently, the BLE communication control unit 320 of the smartphone 1 acquires the identifier (for example, the UUID) of the digital camera 2 using a BLE GATT request message (S1903, step S1607). Next, the wireless LAN communication control unit 310 of the smartphone 1 searches for nearby wireless LAN networks (S1904), and displays a list of the found wireless LAN networks (S1905, step S1608). If the user selects the network of the access point 4, the wireless LAN communication control unit 310 of the smartphone 1 is connected to the wireless LAN network of the access point 4 (S1906, step S1609). The storage device information management unit 370 searches for storage devices existing on the connected wireless LAN network (S1907, step S1611), and displays a selection screen including the found storage devices (S1908, step S1612).

If the user selects the NAS 3 as an upload destination (YES in step S1613), the storage device information management unit 370 stores the identifier information of the NAS acquired in S1907 (S1909, step S1614). Subsequently, the storage device information management unit 370 stores, as wireless LAN network information to be used for the automatic upload processing, the setting information of the wireless LAN network connected in S1906 (S1910, step S1615). Next, the position measurement processing unit 350 of the smartphone 1 activates the GPS function (S1911, step S1618), and receives a GPS signal transmitted by the GPS satellite 9 (S1912, step S1619). The position measurement processing unit 350 of the smartphone 1 calculates (acquires) position information (for example, the latitude/longitude) from the received GPS signal, and stores it (S1913, step S1622).

Figure 20B:
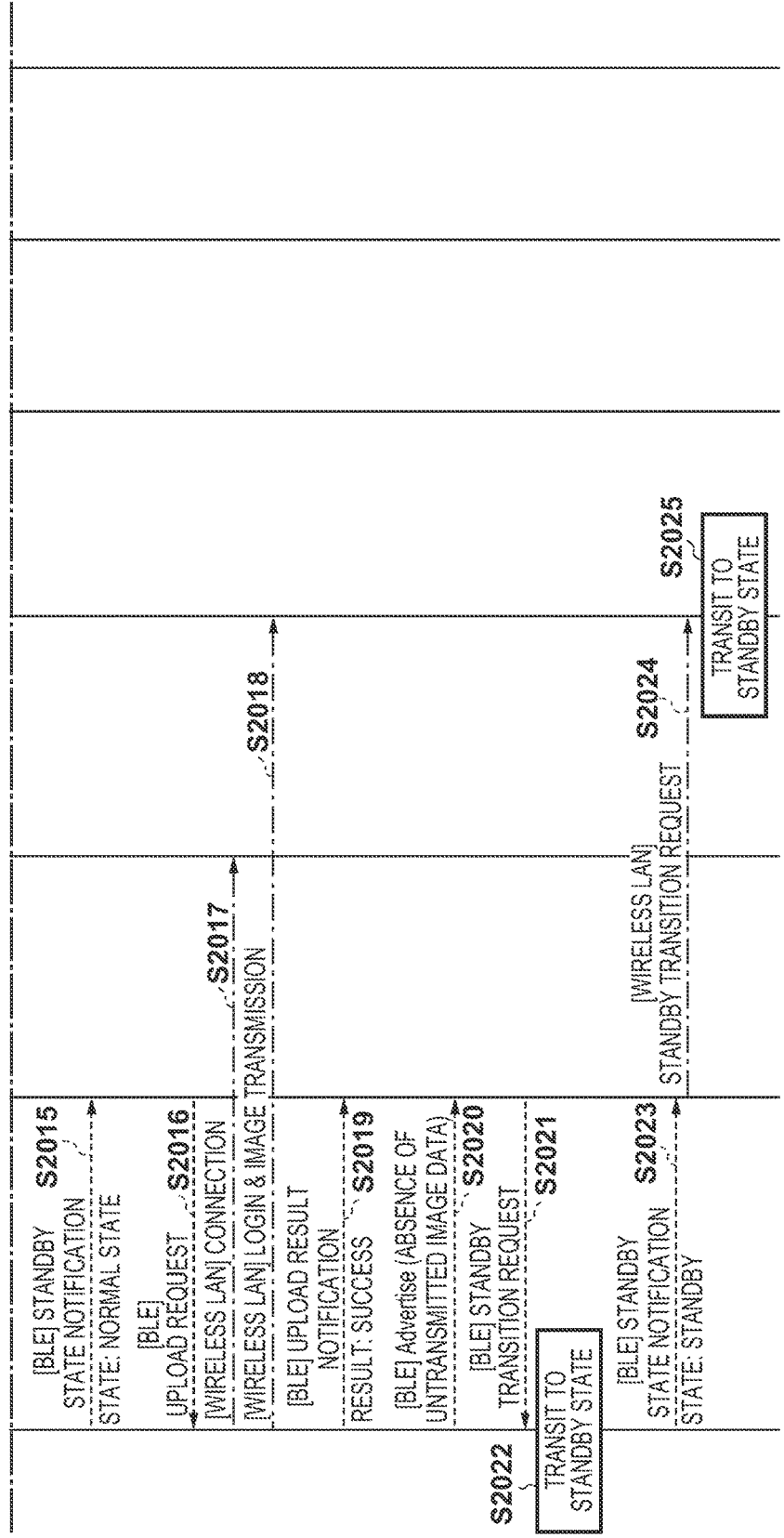

FIGS. 20A and 20B show examples of a communication sequence when the user returns home with the smartphone 1 and the digital camera 2. The operation of the smartphone 1 in the communication sequence shown in FIGS. 20A and 20B correspond to the operation procedures shown in FIGS. 17, 18A and 18B.

In an initial state, the digital camera 2 and the NAS 3 are in the standby state (S2001, S2002), and are in a state in which it is impossible to perform data communication by wireless or wired LAN communication. A BLE communication control unit 420 of the digital camera 2 periodically transmits a BLE Advertise packet regardless of the ON/OFF state of the power supply of the Host unit 20 (S2003, YES in step S1801). The transmitted Advertise packet is set with, for example, a flag to represent that there is the untransmitted image data in the digital camera 2. Furthermore, the access point 4 periodically transmits a beacon frame including the identifier information of the wireless LAN network generated/managed by itself (S2004). Upon receiving the beacon frame, the position measurement processing unit 350 of the smartphone 1 receives a GPS signal transmitted by the GPS satellite 9 (S2005), and calculates (acquires) position information (for example, the latitude/longitude) from the received GPS signal (S2006).

Next, the wireless LAN communication control unit 310 of the smartphone 1 is connected to the access point 4 (S2007, step S1802). The storage device information management unit 370 of the smartphone 1 transmits a standby return request message to the NAS 3 via the wireless LAN communication control unit 310 (S2008, step S1805). In this embodiment, the message is, for example, a Wake-on-Lan message. Upon receiving the standby return request message, the NAS 3 returns to the normal state (S2009) to enter a state in which data communication using wired LAN communication is possible.

Next, the storage device information management unit 370 searches for the NAS 3 via the access point 4 (S2010, step S1806). In this embodiment, the search processing is performed using SSDP. Subsequently, the storage device information management unit 370 of the smartphone 1 acquires the free area (free capacity) of the storage area from the NAS 3 via the wireless LAN communication control unit 310 (S2011, step S1808). Furthermore, the image capturing apparatus information management unit 360 of the smartphone 1 transmits, for example, a GATT request message via the BLE communication control unit 320, and acquires the total size of the untransmitted image data, that is included in a response message transmitted as a response from the digital camera 2 (S2012, step S1809). Assume that the free area of the NAS 3 is larger than the total size of the untransmitted image data of the digital camera 2.

Subsequently, the image capturing apparatus information management unit 360 of the smartphone 1 transmits a standby return request message to the digital camera 2 via the BLE communication control unit 320 (S2013, step S1811). Upon receiving the message, the digital camera 2 returns to the normal state (S2014), turns on the power supply of the Host unit 20, and sends, using, for example, a GATT notification message, a notification that the digital camera 2 has returned to the normal state (S2015). Upon receiving the notification that the digital camera 2 has returned to the normal state, the image capturing apparatus information management unit 360 of the smartphone 1 transmits an upload request message to the digital camera 2 via the BLE communication control unit 320 (S2016, step S1813). This message includes an untransmitted image data upload request, the identifier information (for example, the UUID) of the NAS 3, and the setting information (SSID, BSSID, encryption type, encryption key, authentication type, and the like) of the wireless LAN network generated/managed by the access point 4. When the digital camera 2 receives the upload request message, a wireless LAN communication control unit 410 is connected to the access point 4 by a wireless LAN using the wireless LAN network setting information included in the message (S2017). Subsequently, an upload processing unit 430 logs in to the NAS 3 corresponding to the identifier information (for example, the UUID) designated by the upload request message, and uploads the untransmitted image data to the NAS 3 by wireless LAN communication (S2018).

Upon completion of the upload processing, the BLE communication control unit 420 notifies, using, for example, a GATT notification message, the smartphone 1 of an upload result indicating the success of the upload processing (S2019). The BLE communication control unit 420 transmits a BLE Advertise message indicating the absence of the untransmitted image data (S2020). This message is subsequently, periodically transmitted.

When the smartphone 1 receives the message in S2019, the image capturing apparatus information management unit 360 transmits a standby transition request message to the digital camera via the BLE communication control unit 320 (S2021, step S1816). Upon receiving the standby transition request message, the digital camera 2 turns off the power supply of the Host unit 20 to transit to the standby state (S2022), and transmits, to the smartphone, a GATT notification message representing that the digital camera 2 has transited to the standby state (S2023). The storage device information management unit 370 of the smartphone 1 transmits a standby transition request message to the NAS 3 via the wireless LAN communication control unit 310 (S2024, step S1816). Upon receiving the standby transition request message, the NAS 3 transits to the standby state (S2025), and stops a data communication function via wired LAN communication.

Figure 21A:
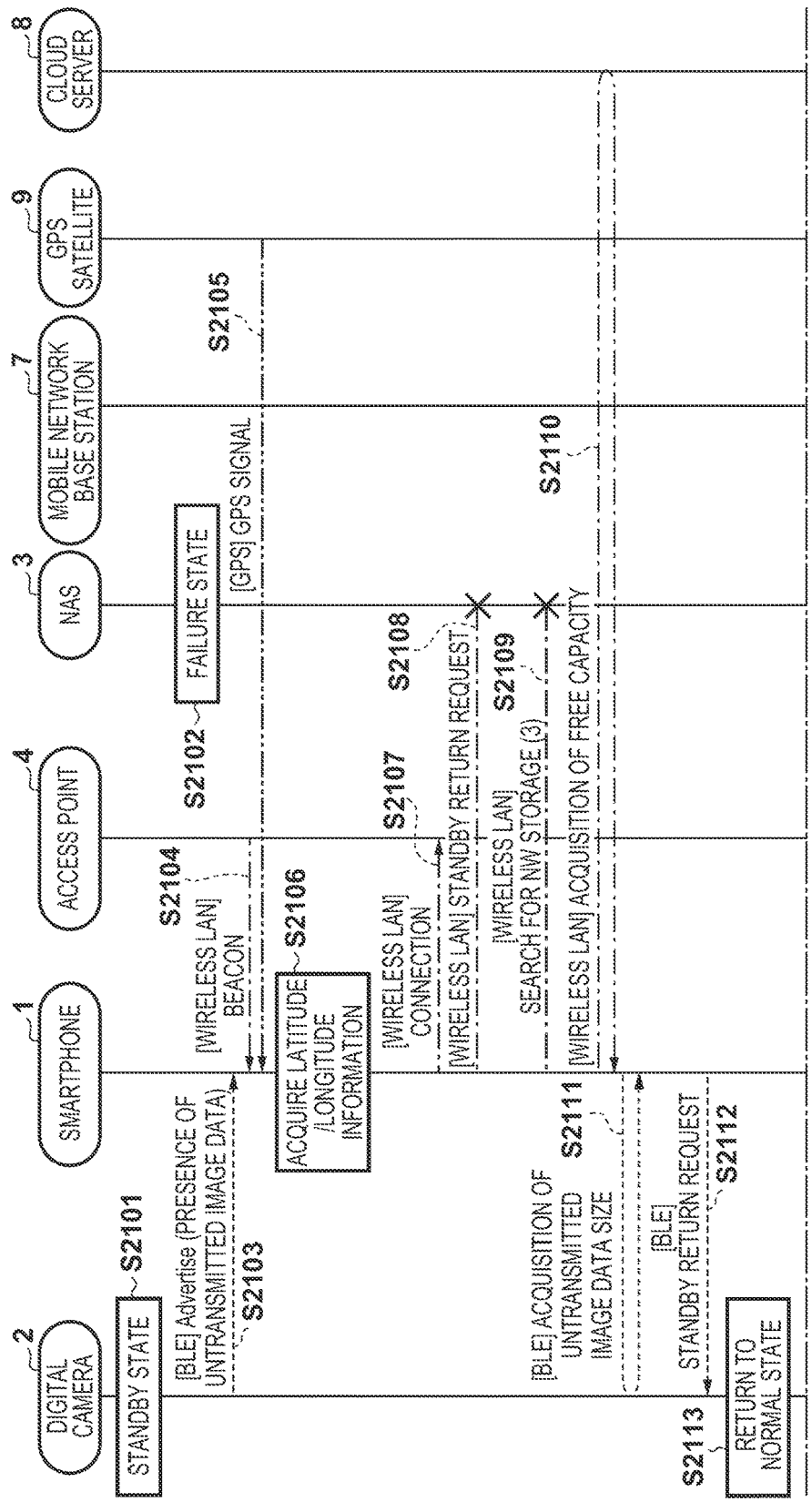

FIGS. 21A and 21B show another examples of the communication sequence when the user returns home with the smartphone 1 and the digital camera 2. More specifically, FIGS. 21A and 21B exemplify processing of uploading image data to the cloud server 8 when the NAS 3 cannot be used due to a failure or the like. Only a difference portion from FIGS. 20A and 20B will be described below.

Since a failure of the NAS 3 has occurred (S2102), the standby return request message transmitted by the smartphone 1 does not reach the NAS 3 (S2108). In addition, since the search processing performed by the storage device information management unit 370 fails (S2109), the storage device information management unit 370 acquires the free area (free capacity) of the storage area from the cloud server 8 via the wireless LAN communication control unit 310 (S2110). After that, the smartphone 1 performs activation processing of the digital camera 2 (S2112 to S2114), and transmits an upload request message (S2115). At this time, this message includes the identifier of a service provided by the cloud server 8.

Upon receiving the upload request message, the digital camera 2 is connected to the access point 4 (S2116), and then logs in to the cloud server 8 to upload the image data (S2117). Subsequent processing between the smartphone 1 and the digital camera 2 is the same as that shown in FIGS. 20A and 20B. The smartphone 1 transmits no standby transition request message to the NAS.

As described above, according to this embodiment, even if the NAS 3 has no BLE communication function, it is possible to upload, to the NAS 3, image data captured and obtained by the digital camera 2 without user's awareness while reducing the power consumption of the smartphone 1.

The representative embodiments of the present invention have been described. The present invention is not limited to the embodiments shown in the specifications and drawings, and various modifications can be made without departing from the scope of the present invention.

Note that when the smartphone 1 makes a notification to the user in the above embodiments, a message is displayed on the display unit 100. However, the present invention is not limited to this. For example, a notification may be made to the user by a sound or vibration. Especially, when displaying a message indicating that automatic upload has failed, a notification is made to the user together with a sound or vibration, thereby obtaining an effect that the user can detect, without seeing the smartphone 1, that automatic upload using the AP in the house cannot be performed.

As a method of determining the presence/absence of the untransmitted image data of the digital camera 2 by the smartphone 1 according to the above embodiments, a method of monitoring the flag information of a BLE Advertise packet has been exemplified (step S603). However, the present invention is not limited to this, and another message packet of BLE or a wireless LAN communication packet may be used. The user may set the presence/absence of the untransmitted image data by operating the smartphone 1.

Furthermore, in the above embodiments, a method using a BLE message and a method using a Wake-on-LAN message have been described as methods in which the smartphone 1 causes the digital camera 2 and the NAS 3 to return from the standby state. However, other communication means may be used. Similarly, the above embodiments have exemplified BLE as the first communication means for implementing the present invention. However, other communication means may be used. For example, communication complying with a communication standard such as Zigbee®, IrDA (Infrared Data Association), or Wireless USB may be performed.

The above embodiments have explained a method of determining, using one piece of wireless information (a BLE packet transmitted by the NAS 3 or a wireless LAN packet of the access point 4), whether the packet can be received, as a method of determining whether the smartphone 1 is located within a predetermined range. However, the present invention is not limited to this. The determination processing may be performed by combining a plurality of pieces of wireless information, or the predetermined range may be determined by combining the wireless information with information of radio field intensity and the like. This makes it possible to more accurately determine the predetermined range.

In the above embodiments, only one position (range) is registered in the smartphone 1, and if the smartphone 1 enters the range, a message for requesting to return from the standby state is transmitted. However, the present invention is not limited to this, and a plurality of positions may be registered in the smartphone 1. In this case, the identifier of an external storage apparatus is stored in association with the position information registered in the smartphone 1. This can reduce the possibility that a media file is erroneously transmitted to an unexpected storage apparatus.

In this embodiment, a message based on BLE is used as a message for causing the apparatus to return (transit) from the standby state to the normal state. However, for example, Wake Up On LAN can be used for wired communication, and Wake Up On WLAN can be used for wireless communication.

As described above, according to the above embodiments, it is possible to automatically upload media files captured by the digital camera without any special operation by the user. Therefore, the above-described usage can reduce the power consumption of the smartphone 1, digital camera 2, and NAS 3 while improving the usability by automatically uploading captured data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-085609, filed Apr. 24, 2017, which is hereby incorporated by reference herein in its entirety.

What is claimed is:

1. A communication apparatus comprising:
a transceiver configured to communicate a wireless signal complying with a first communication method for searching for another communication apparatus and a storage apparatus; and
a controller configured to:
control, in a case where the transceiver detects the another communication apparatus and the storage apparatus, the transceiver to transmit, to the another communication apparatus and the storage apparatus using the first communication method, a first request for causing the another communication apparatus and the storage apparatus to transit from a first state to a second state, wherein communication using a second communication method, which is different from the first communication method, is restricted in the first state, and communication using the second communication method is possible to transmit data stored in the another communication apparatus to the storage apparatus using the second communication method in the first state;
determine whether the another communication apparatus and the storage apparatus are in the first state or the second state; and
control, in a case where the controller determines that the another communication apparatus and the storage apparatus are in the second state, the transceiver to transmit a second request for transmitting the data stored in the another communication apparatus to the storage apparatus using the second communication method.

2. The apparatus according to claim 1, further comprising:
a detector configured to detect that the communication apparatus exists within a predetermined range of the another communication apparatus,
wherein in a case where the detector detects that the communication apparatus exists within the predetermined range of the another communication apparatus and the transceiver detects the another communication apparatus and the storage apparatus, the controller controls the transceiver to transmit the request to the another communication apparatus and the storage apparatus using the first communication method.

3. The apparatus according to claim 1, wherein the second state is a state where power consumption is higher than in the first state.

4. The apparatus according to claim 2, wherein in a case where the detector does not detect that the communication apparatus exists within the predetermined range of the another communication apparatus, the controller controls the transceiver to transmit the first request in response to an operation by a user.

5. The apparatus according to claim 1, wherein in a case where the controller determines that one of the another communication apparatus or the storage apparatus is in the first state, the controller controls the transceiver to transmit a request for causing the another communication apparatus, determined to be in the first state, to return from the first state to the second state.

6. The apparatus according to claim 5, wherein the controller, in a case where the storage apparatus is determined to be in the second state:
acquires a storage area in the storage apparatus and a size of the data stored in the another communication apparatus; and
compares the acquired storage area with the size of the data; and
transmits the second request in a case where the storage area is larger than the size of the data.

7. The apparatus according to claim 6, wherein in a case where the storage area is not larger than the size of the data, the storage apparatus is not found, or an instruction is received from a user, the transceiver transmits, to the another communication apparatus using communication by the first communication method, a third transmission request for transmitting the data stored in the another communication apparatus to a cloud server on a cloud environment.

8. The apparatus according to claim 2, wherein the detector detects, using a GPS (Global Positioning System), that the communication apparatus exists within the predetermined range of the another communication apparatus.

9. The apparatus according to claim 1, wherein:
the first communication method complies with Bluetooth® Low Energy, and
the second communication method complies with IEEE802.11 series.

10. The apparatus according to claim 1, wherein the controller includes at least one processor.

11. A control method for a communication apparatus, the method comprising:
communicating a wireless signal complying with a first communication method for searching for another communication apparatus and a storage apparatus;
transmitting, in a case where the another communication apparatus and the storage apparatus are detected, to the another communication apparatus and the storage apparatus using the first communication method, a request for causing the another communication apparatus and the storage apparatus to transit from a first state to a second state, wherein communication using a second communication method different from the first communication method is restricted in the first state, and communication using the second communication method is possible to transmit data stored in the another communication apparatus to the storage apparatus using the second communication method in the first state;

determining whether the another communication apparatus and the storage apparatus are in the first state or the second state; and transmitting, in a case where the another communication apparatus and the storage apparatus are determined to be in the second state, a second request for transmitting the data stored in the another communication apparatus to the storage apparatus using the second communication method.

12. A non-transitory computer-readable storage medium storing a computer program executable by a computer to execute a control method for a communication apparatus, the method comprising:

communicating a wireless signal complying with a first communication method for searching for another communication apparatus and a storage apparatus;

transmitting, in a case where the another communication apparatus and the storage apparatus are detected, to the another communication apparatus and the storage apparatus using the first communication method, a request for causing the another communication apparatus and the storage apparatus to transit from a first state to a second state, wherein communication using a second communication method different from the first communication method is restricted in the first state, and communication using the second communication method is possible to transmit data stored in the another communication apparatus to the storage apparatus using the second communication method in the first state;

determining whether the another communication apparatus and the storage apparatus are in the first state or the second state; and transmitting, in a case where the another communication apparatus and the storage apparatus are determined to be in the second state, a second request for transmitting the data stored in the another communication apparatus to the storage apparatus using the second communication method.

* * * * *